J. A. WERNER.
CASH REGISTER AND MONEY CHANGER.
APPLICATION FILED SEPT. 30, 1915.

1,279,053.

Patented Sept. 17, 1918.
12 SHEETS—SHEET 4.

Inventor
JOHN A. WERNER

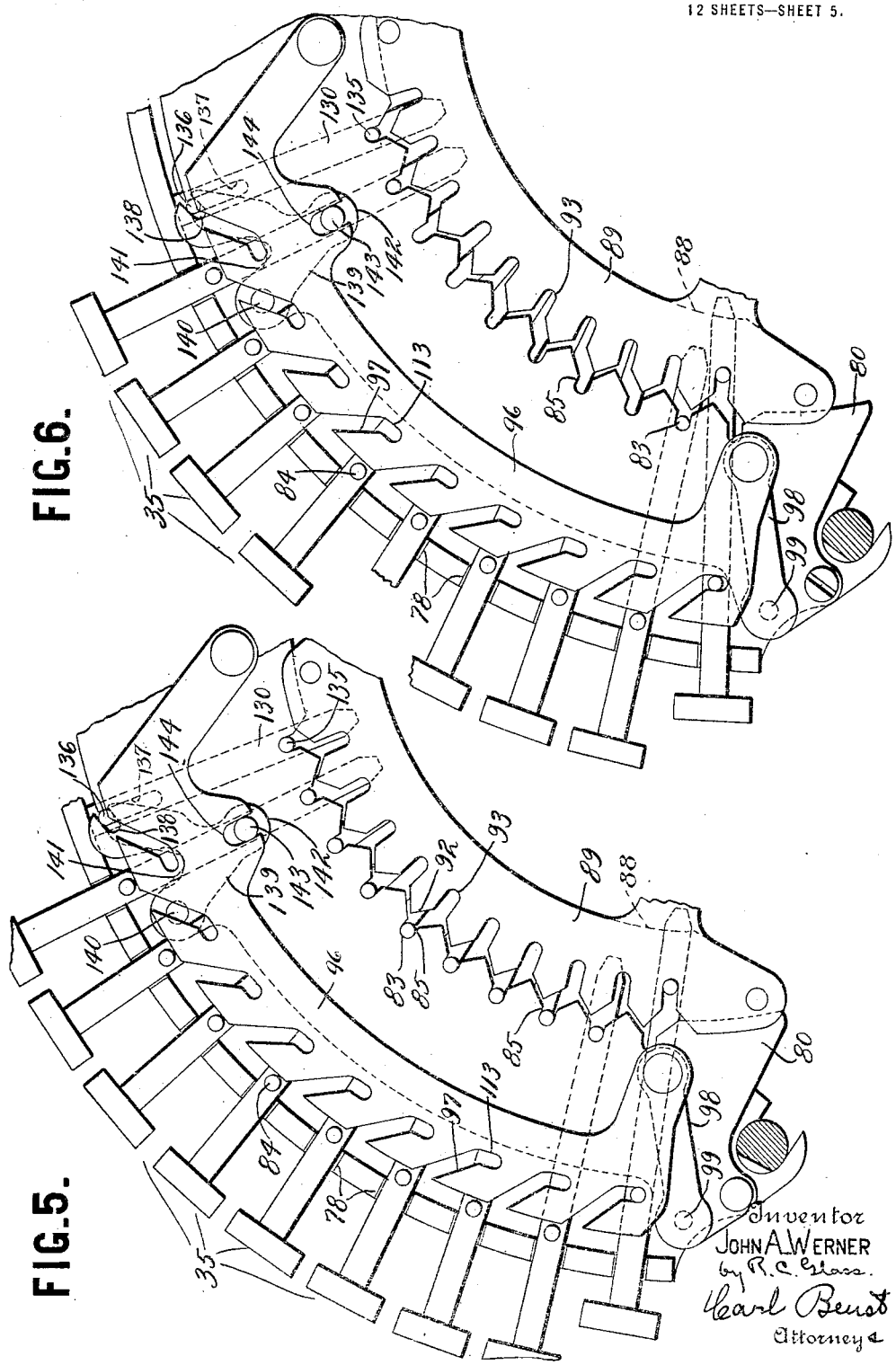

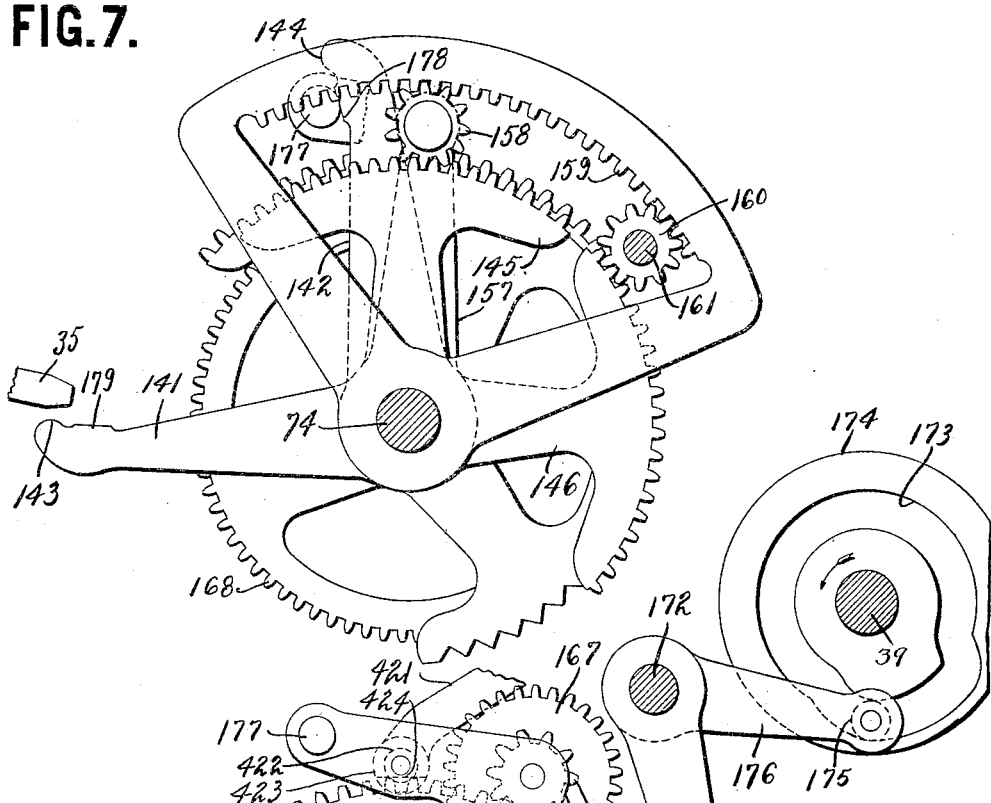
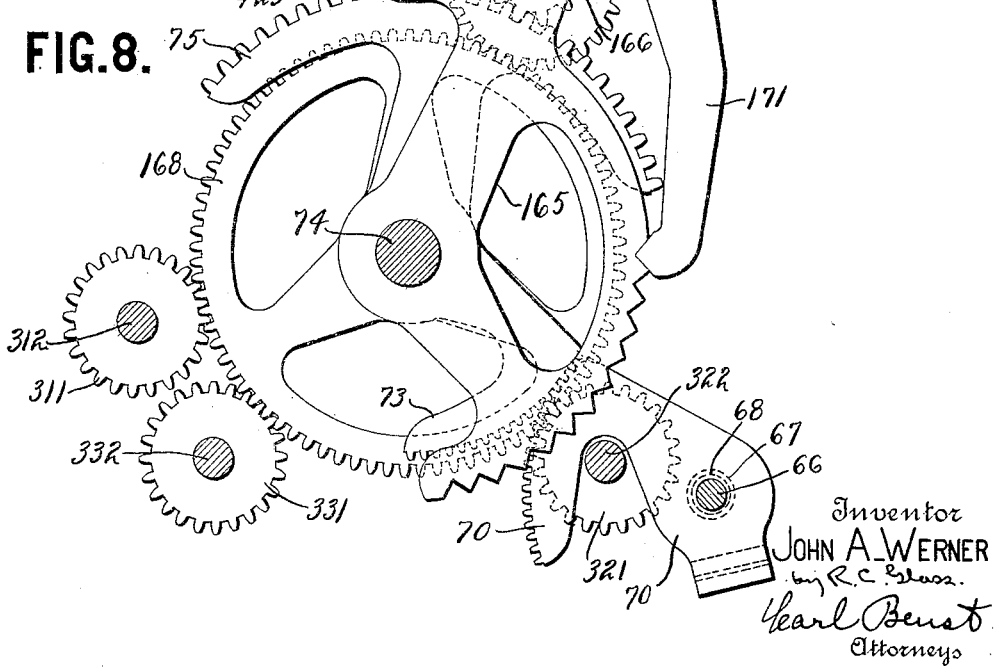

J. A. WERNER.
CASH REGISTER AND MONEY CHANGER.
APPLICATION FILED SEPT. 30, 1915.

1,279,053.

Patented Sept. 17, 1918.
12 SHEETS—SHEET 7.

FIG. 9.

Inventor
JOHN A. WERNER
Attorneys

J. A. WERNER.
CASH REGISTER AND MONEY CHANGER.
APPLICATION FILED SEPT. 30, 1915.

1,279,053.

Patented Sept. 17, 1918.
12 SHEETS—SHEET 9.

Inventor
JOHN A. WERNER
by R C Glass
Carl Beust
Attorneys

J. A. WERNER.
CASH REGISTER AND MONEY CHANGER.
APPLICATION FILED SEPT. 30, 1915.
1,279,053.
Patented Sept. 17, 1918.
12 SHEETS—SHEET 10.
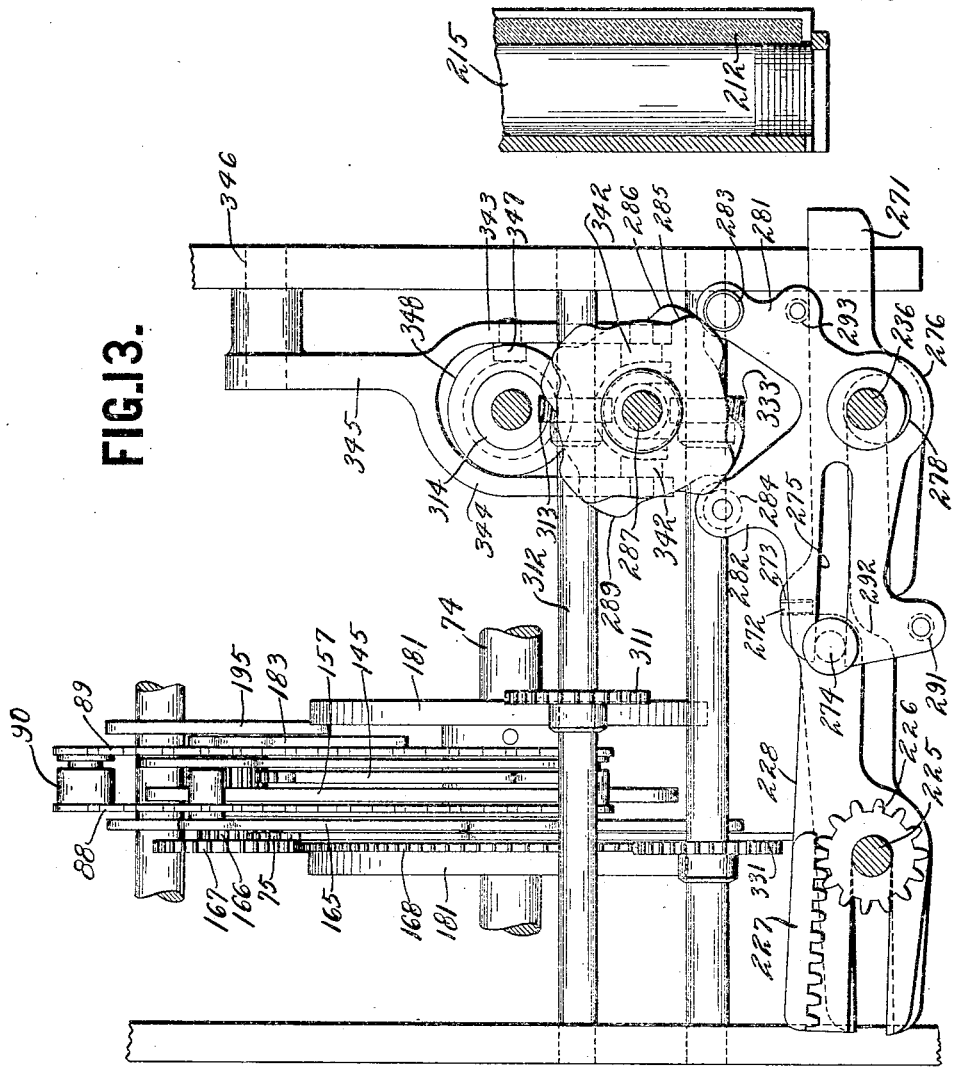
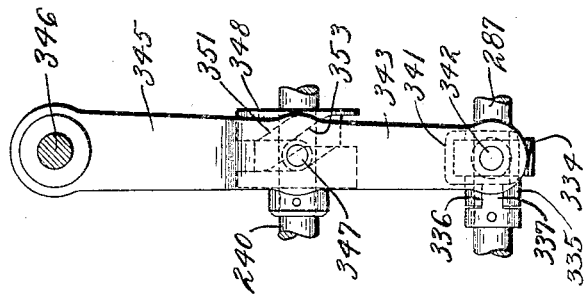
Inventor
JOHN A. WERNER
by
Carl Beust
Attorneys

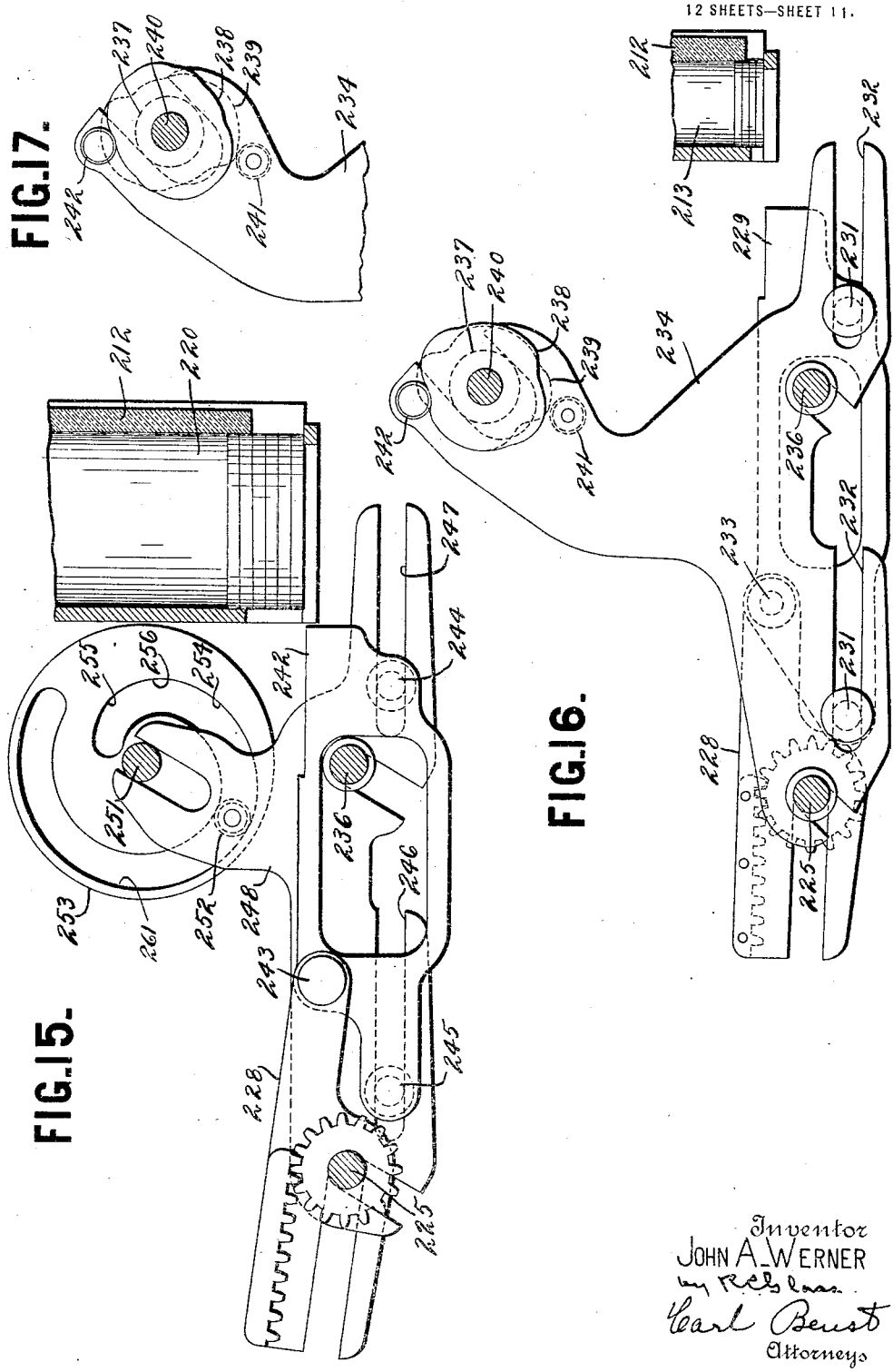

J. A. WERNER.
CASH REGISTER AND MONEY CHANGER.
APPLICATION FILED SEPT. 30, 1915.

1,279,053.

Patented Sept. 17, 1918.
12 SHEETS—SHEET 12.

Inventor
JOHN A. WERNER
by R. C. Glass.
Carl Beust
Attorneys

UNITED STATES PATENT OFFICE.

JOHN A. WERNER, OF DAYTON, OHIO, ASSIGNOR TO THE NATIONAL CASH REGISTER COMPANY, OF DAYTON, OHIO.

CASH-REGISTER AND MONEY-CHANGER.

1,279,053.  Specification of Letters Patent.  Patented Sept. 17, 1918.

Application filed September 30, 1915. Serial No. 53,295.

*To all whom it may concern:*

Be it known that I, JOHN A. WERNER, a citizen of the United States, residing at Dayton, in the county of Montgomery and State of Ohio, have invented certain new and useful Improvements in Cash-Registers and Money-Changers, of which I declare the following to be a full, clear, and exact description.

This invention relates to improvements in cash registers and has particular reference to change making mechanisms for such machines.

In the accompanying drawings the invention is shown applied to a cash register of the type fully shown and described in U. S. Letters Patent 580,378 issued April 13, 1897 to J. P Cleal and F. A. Reinhard and 754,049 issued March 8, 1904, to Thomas Carroll. This embodiment is illustrative only, however, as one object of the invention is to provide a change making mechanism which may readily be applied to a number of different types of machines without its first being necessary to make material alterations in the original mechanisms to accommodate the improvement.

Two sets of keys are employed, a set of amount tendered keys and the usual set of amount of purchase keys. The two sets jointly control the ejection of the change. Another of the objects of the invention is to provide mechanism whereby if the machine should be operated with an amount on the purchase keys exceeding the amount on the amount tendered keys the change ejecting devices will all be disabled and a special indicator exposed calling attention to the misoperation.

Another object of the invention is to provide mechanism for controlling the operation of ejectors which each never eject more than a single coin. These ejectors are normally connected to the main driving mechanism, but the ones which are not to perform their functions during an operation are automatically disconnected by mechanism controlled jointly by the amount purchased and the amount tendered keys.

Another object of the invention is to provide an improved ejector controlling mechanism comprising a plurality of independently movable groups of controlling elements with connections whereby the movement of one group beyond a certain point will impart an added movement to the elements of another group to control the ejection of certain coins.

Still another object is to provide a novel mechanism controlled by lower order differential elements for imparting a step of movement to differential elements of higher order. This is effected by automatically adjusting the manipulative devices controlling the higher order elements from one controlling position to another. In the illustrative embodiment the amount tendered keys in the higher order banks are loosely mounted in their supporting frames and when they are depressed their inner ends become engaged with movable frames. In case a higher order differential element has to be turned back one step to effect ejection of the correct change the movable frame associated therewith is rocked, thereby swinging the inner end of the depressed key to a position corresponding to the next lower value. This movement is imparted to the differential element associated with the key through connections which remain effective during the greater part of the operation.

With these and incidental objects in view, the invention consists in certain novel features of construction and combinations of parts, the essential elements of which are set forth in appended claims, and a preferred form of embodiment of which is hereinafter described with reference to the drawings which accompany and form part of the specification.

Of said drawings:—

Fig. 5 is a detail of one of the amount tendered key banks and shows the "9" key depressed to its first controlling position and the zero stop withdrawn to its ineffective position.

Fig. 6 is the same as Fig. 5 except that it shows the position occupied by the "9" key after it has been swung from its first to its second controlling position.

Fig. 7 shows the mechanism controlled by one of the amount tendered key banks for adjusting the corresponding coin ejector controlling elements in one direction and Fig. 8 shows the mechanism controlled by one of the banks of amount purchased keys for adjusting the coin ejector controlling elements in the opposite direction.

Fig. 9 is a front view of mechanism at the right side of the machine and shows, among other things, devices for operating the special indicator and mechanism for disabling all of the ejectors in case the machine should be operated with an amount on the purchase keys exceeding the amount on the amount tendered keys.

Fig. 13 is a front view of mechanism controlled jointly by the tens of cents banks of amount tendered and amount purchased keys. It also shows the connection whereby movement of the penny ejector controlling elements to above a certain value imparts an added movement to the group of elements controlled by the tens of cents key banks.

Fig. 14 is a detail of the cam and other devices whereby rotation of the penny shaft to a point above its four cent position will impart a half step of rotation to the shaft controlling the ejection of coins of higher value.

Fig. 15 is a detail of mechanism for ejecting the silver dollars.

Fig. 16 is a detail of one of the penny ejectors and the devices immediately coöperating therewith for adjusting and operating the ejector.

Fig. 17 is a detail of the controlling cams for the other penny ejector.

Figure 1:
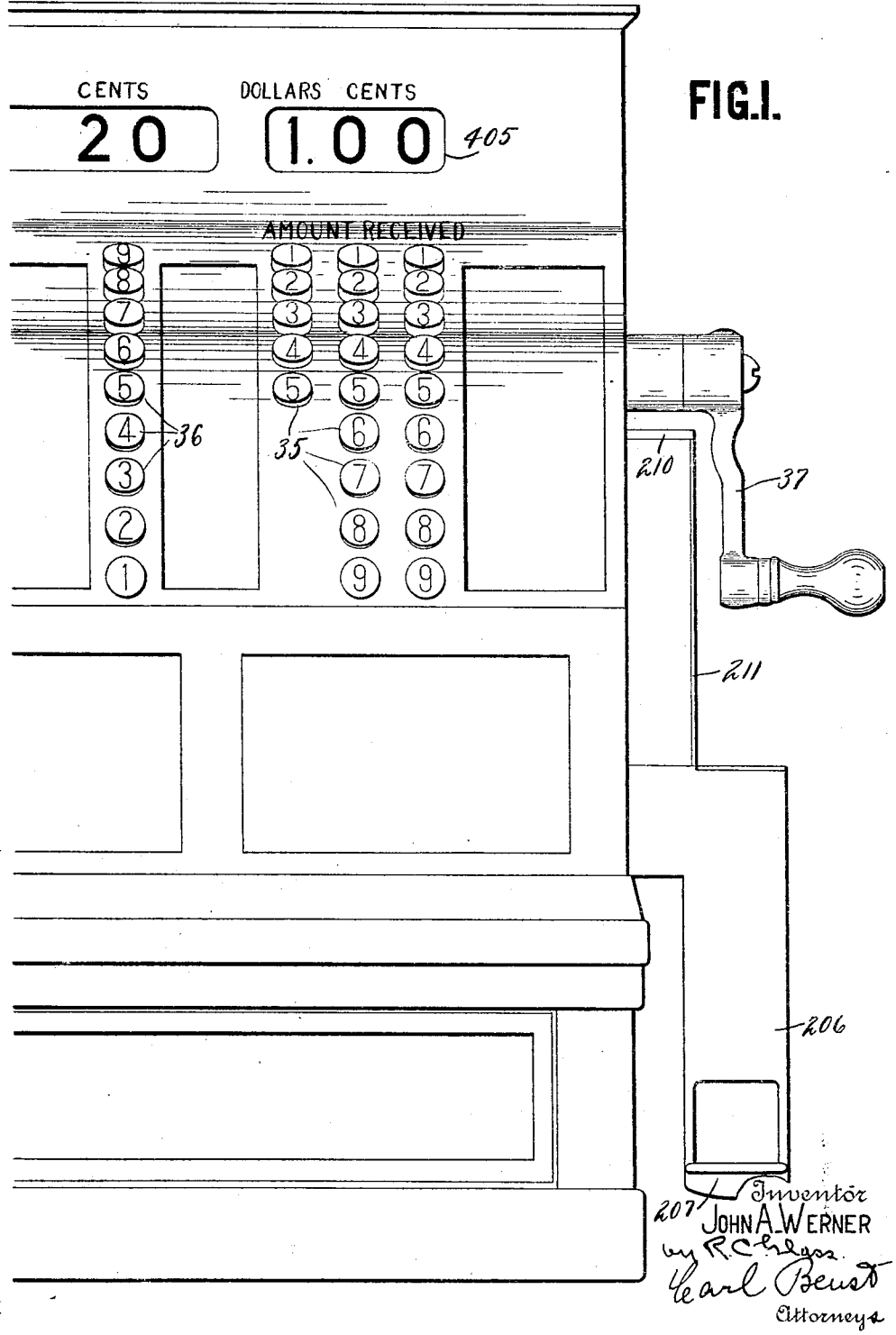
Figure 1 is a partial front elevation of the illustrative machine with the improvement applied thereto.

Described in general terms, the improved machine has two sets of keys, one forming a part of the regular mechanism for entering the amounts of purchases and the other set for amounts tendered. Each set controls a corresponding group of indicators so that at the end of an operation there will be displayed at the top of the machine figures showing the amount of the sale and the value of the coin or bill tendered in payment. The two sets of keys jointly control mechanism for ejecting the change.

In the present instance, eight coin tubes are employed, two for pennies, two for dimes, one for nickels, one for quarters, one for half-dollars and one for dollars, with an ejector coöperating with each of the tubes. Three rotatable shafts are provided, one carrying controlling elements for the penny ejectors, one carrying controlling elements for the dimes, nickels, quarters and half dollars ejectors and one for the dollars ejector. These shafts are independently rotatable under the joint control respectively of the units of cents, tens of cents, and dollars banks of amount tendered and amount purchased keys, although, if the first or units of cents shaft is rotated to a position above its four cent position a cam thereon will operate a connection to the second or tens of cents shaft to turn the latter shaft a half step. The machine is arranged to eject not more than four pennies at a single operation and the purpose of this half step of movement of the second shaft is to position the controlling elements thereon to properly effect ejection of the coins of higher value.

The mechanism coöperating with each bank of amount tendered keys comprises a pair of complementarily movable members which are given differential movements in opposite directions at each operation to engage them either with the zero stop for the bank or with any key in the bank which may have been depressed. As the arms are brought together they adjust a pivoted element from the position at which it was left at the end of the preceding operation directly to a position corresponding to the key operated. To the side of the element is pivoted a pair of rigidly connected gears. As the element moves one of the gears rotates about a segment which at that time is either stationary or is moving in the opposite direction back to a normal starting point. The other gear of the pair is in mesh with a main differential gear forming a part of the coin ejector controlling mechanism so that movement of the element will effect adjustment of the main gear to a position corresponding to the amount tendered key operated. The segment which was just described as being either stationary or moving in the opposite direction to its starting point is then advanced from the starting point to a position corresponding to the amount purchased key operated. As it moves to adjusted position it will drive the pair of rigidly connected gears, the element carrying the gears having by this time come to rest, thereby causing a corresponding extent of rotation of the main differential gear in the direction opposite to that in which it was rotated under the control of the amount tendered keys. If considered in connection with one main gear only, the net result of these two movements is that the main gear is positioned properly to represent the difference between the amount set up on the two banks of the same denomination at the beginning of an operation. For example, if a purchase amounting to 10 cents is made and a 50 cent piece is tendered in payment, the main gear controlled by the tens of cents bank will first be adjusted in the amount tendered direction to the "5" position after which it will be reversely rotated one step in the amount purchased direction to the "4" position. Both movements of the main gear are transmitted directly to the rotatable shaft carrying the elements controlling the operation of the ejectors so that at near the end of the operation forty cents in change will be ejected.

It is apparent that in the example just mentioned the operator might accidentally have depressed the 10 cent key in the amount tendered bank and the 50 cent key in the amount purchased bank, that is, just the reverse of the correct operation of the keys. If no means were provided to prevent it the main differential gear would then first be adjusted to the 1 position under the control of the amount tendered key and would then be reversely rotated five steps through zero to the "6" position. As a result too much change would then be ejected. To overcome this, mechanism is provided whereby such a misoperation will disconnect from the driving mechanism an operating shaft common to all of the ejectors so that none of the ejectors will be moved. At the same time a special indicator will be displayed calling attention to what has been done.

In order to effect ejection of the correct change it is necessary to provide what might be called a borrowing mechanism, that is, a mechanism whereby higher order main ejector controlling or differential gears may be set back a step under the control of gears of lower order. For instance, if a purchase of 50 cents is made and a $5 bill is tendered in payment, during the operation the main gear for the dollars bank will be advanced to the five position and the main gear for the tens of cents bank will be turned back from its zero to its 5 position, so at this point in the operation the two gears in question will be at positions calling for $5.50 in change. Before the ejectors are operated the dollars gear must be turned back one step to the "4" position. This is effected by swinging the inner end of the depressed five dollar key to the four dollar position thereby, through the complementary movable arms which still remain in engagement with the key, effecting the necessary step of reverse movement of the dollars gear and the ejector controlling devices connected thereto.

The swinging or oscillatory movement is imparted to the amount tendered keys by a movement of a rock frame for each higher order amount tendered bank, with which frames the keys become engaged when they are depressed. These frames are rocked only when the lower order main differential gears have been turned backward from zero. The lower order gears each have attached to their sides cams so arranged that when the gears move reversely from zero they will raise levers pivoted to the higher order rock frames into positions to be engaged by shoulders on the peripheries of disks attached to one of the driving shafts. When the shoulders engage the levers the rock frames are drawn upward and latched in the raised position, thereby swinging the inner ends of keys engaged with the frames from one controlling position to the position of next lower value and holding them in the second position. At the beginning of the succeeding operation the rock frame will be restored to its normal position. If a key is depressed before the corresponding rock frame is restored, the inner end of the key will be deflected upward as it engages the rock frame, so that when fully depressed the key will be in the same position of lower value as though it had been moved to perform the borrowing operation. Restoring movement of the rock frame corrects this, however, in time to control properly the setting of the differential mechanism, after which the frame may again be rocked to turn the main differential gear back a step.

*Keyboard and differential mechanism.*

As previously pointed out, the machine has two sets of keys, the regular amount purchased keys and a set for amounts tendered. The amount tendered keys 35 (Fig. 1) are arranged in three rows or banks two running from "1" at the top to "9" at the bottom, and the other running from "1" down to "5". It is apparent that the present machine is intended to make change for coins and bills up to five dollars although, as will be clearer later on, there is nothing to prevent adding other keys in case a higher change making capacity is desired. The amount purchased keys 36 are arranged as in the patents above cited, that is, with the keys of lower value at the bottom and the keys of higher value at the tops of the banks. Only the right hand or units of cents bank is shown in Fig. 1, this being sufficient for the purpose in view of the fact that the amount purchased banks are all alike so far as the arrangement of the keys is concerned.

Figure 3:
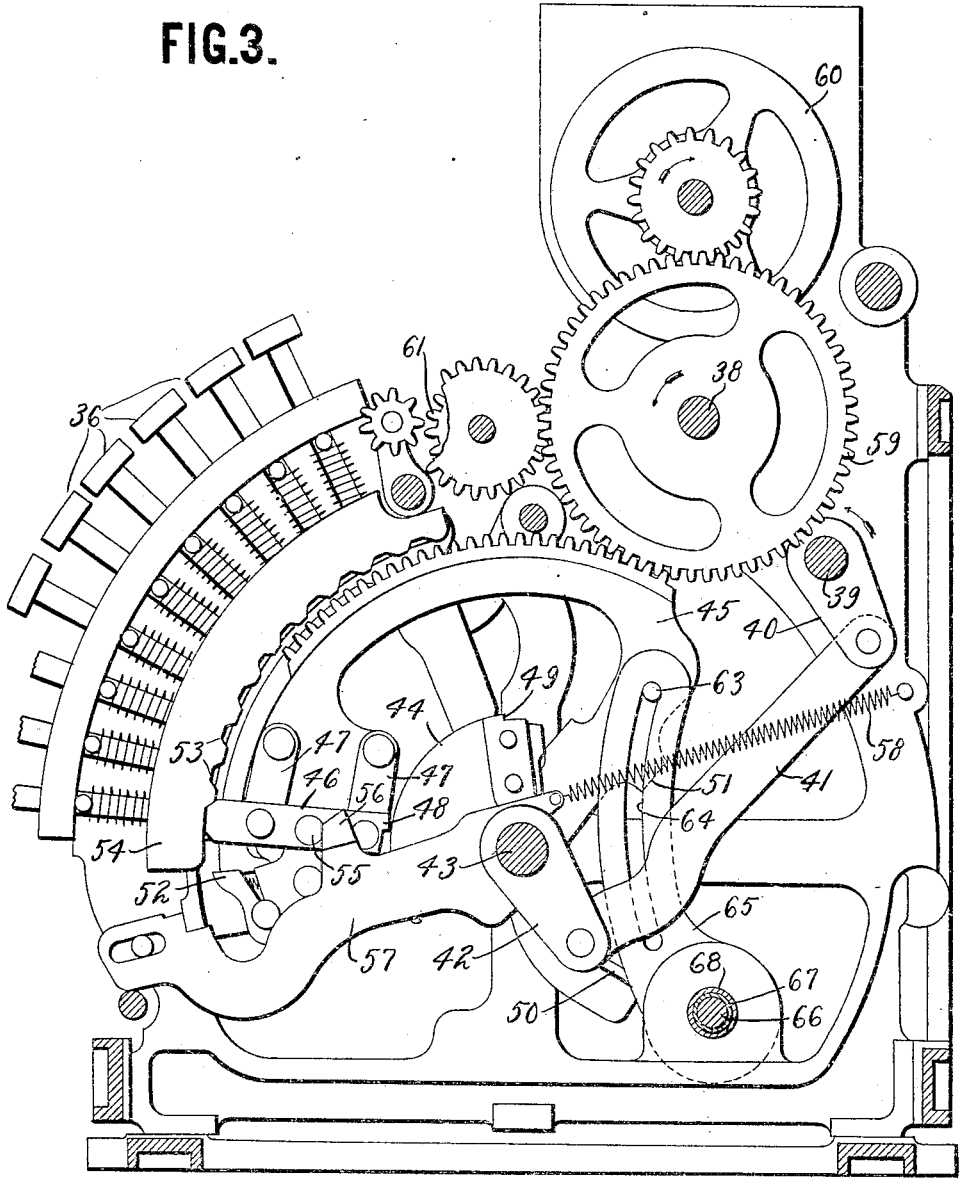
Fig. 3 is a section taken through the machine at the right of one of the amount of purchase key banks.
Figure 4:
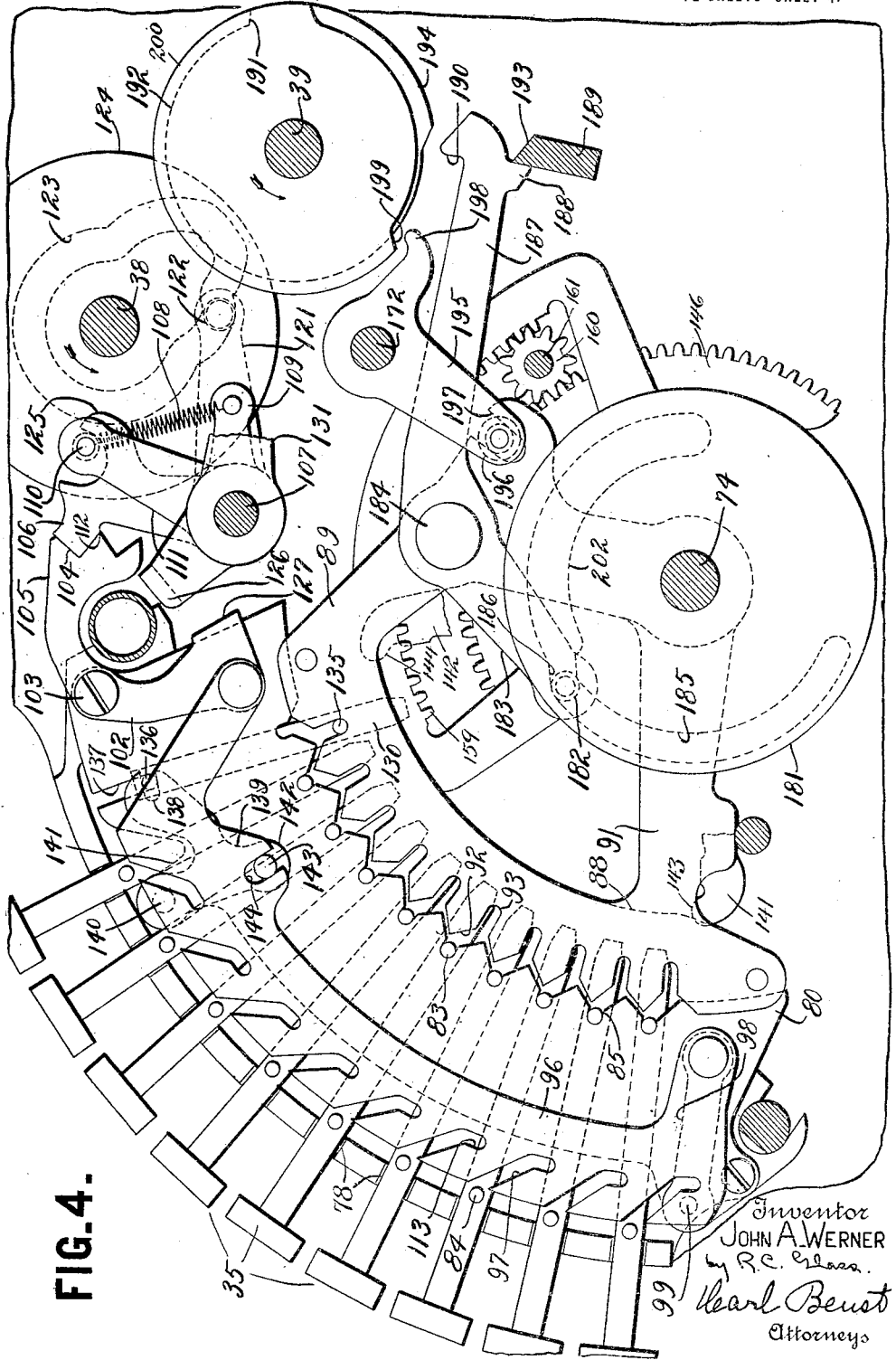
Fig. 4 is part of a section taken through the machine at the right of the tens of cents bank of amount tendered keys.

The machine may be driven either by means of a handle such as shown at 37 or by means of a motor, the driving mechanism comprising shafts 38 and 39 extending across the machine. Both of these shafts make a complete rotation at each operation in the direction indicated by the arrows (Figs. 3 and 4). Fastened to the shaft 39 is a crank arm 40 (Fig. 3) connected by a link 41 to an arm 42 secured to a rock shaft 43 extending the width of the amount purchased mechanism. Rigid on the shaft 43 is a series of segmental plates 44, there being one of these plates for each row of amount purchased keys. The arm 40 is shorter than the arm 42 so that at each rotation of the shaft 39 the shaft 43 and the plates 44 thereon are simply oscillated through an arc of about 90 degrees, first counter clockwise and then clockwise (Fig. 3). Pivoted on the shaft 43 and adjacent each of the plates 44 is an operating member 45. Each of these members has a plunger 46 loosely supported by links 47 pivotally attached at their upper ends to the member 45. At its inner or rear end the plunger 46 has a shoulder 48 to coöperate with a cut 49 in the periphery of the plate 44. If the parts are all in the position shown in Fig. 1 and the machine is operated the counter clockwise movement of the plate 44 will bring the cut 49 under the shoulder 48. A spring (not shown but well known in the type of machine illustrated) will then cause the plunger to move endwise to seat the shoulder in the cut. At the same instant an arm 50, rigid with the segmental plate 44 will engage the member 45 at 51 and, owing to the connection thus formed, the member 45 and the plate 44 will move as a unit during the clockwise movement of the latter until a trip 52 operatively connected with the plunger 46 strikes the inner end of any one of the amount purchased keys 36 that may have been depressed. When said trip strikes the key the plunger is projected forward thereby disengaging the shoulder 48 from the cut 49 and engaging the forward end of the plunger with one of the notches 53 in a stationary frame plate 54. The plunger is locked in engagement with said notch during the rest of the operation by the shoulder 48 riding on the concentric edge of the plate 44. When at the beginning of the next operation the plate 44 is again moved counter clockwise the cut 49 will again be brought under the shoulder 48 and the spring above mentioned, but which is not shown, will again move the plunger 46 to withdraw it from engagement with the notch 53 and engage the shoulder 48 with the cut 49, while the arm 50 will again engage the member 45 at 51. The plate 44 and operating member 45 then move as a unit until the operating member is restored to its normal starting point. If no key in the row has been depressed, the operating member will be disconnected from the plate 44 by a pin 55 carried by the plunger 46 engaging and being forced forward by the beveled upper end of an extension 56 of a sliding plate 57 to engage the end of the plunger with the lowest or zero notch 53 in the plate 54. The operating member 45 will be held locked in zero position during the remainder of the operation by the circular edge of the plate 44. The sliding plate 57 forms no part of the present invention and is fully shown and described in the Cleal and Reinhard patent. It is sufficient for the present purpose to state that whenever an amount purchased key 36 is depressed the plate 57 is released and drawn rearwardly by a spring 58 thus carrying the extension away from the pin 55 to release the plunger. The shoulder 48 will then engage the cut 49 when the cut is again brought under the shoulder so that the plate 44 and operating member 45 will again move as a unit in the clockwise direction until the trip 52 strikes the depressed key. Movement of the operating member 45 is transmitted through an intermediate gear 59 to an indicator 60 and to a totalizer 61.

Figure 12:
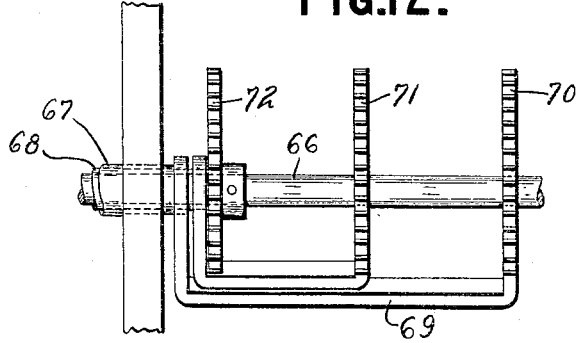
Fig. 12 is a detail of the segments controlled by the amount of purchase keys for actuating the coin ejecting mechanism.
Figure 18:
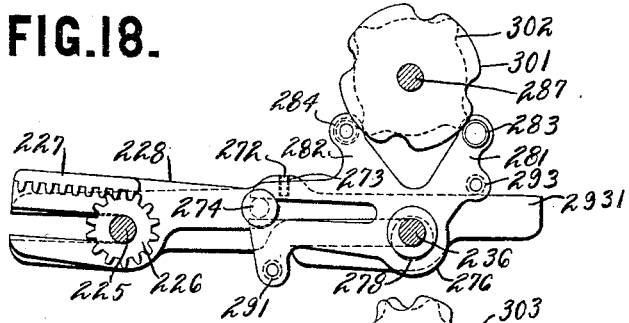
Fig. 18 is a detail of the controlling elements and operating mechanism for one of the dimes ejectors, the other dime ejector and the controlling and operating devices therefor being shown in Fig. 13.
Figure 19:
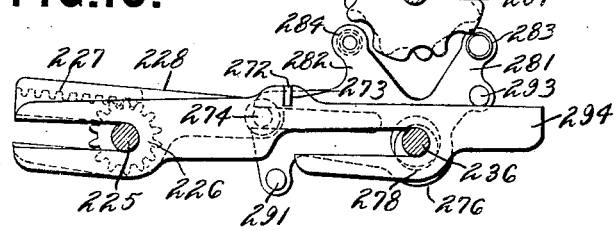
Fig. 19 is a detail of the controlling elements and ejecting devices for five cent pieces.
Figure 20:
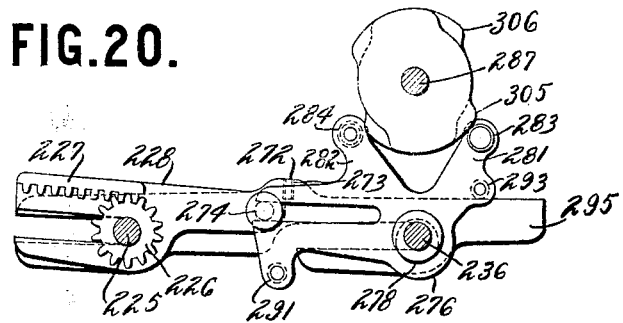
Fig. 20 is a detail of the controlling elements and ejecting devices coöperating with the tube holding the twenty-five cent pieces.

Each of the operating members 45 carries a pin 63 projecting into a curved slot 64 formed in an arm 65. The arm associated with the dollars bank of amount purchased keys is attached to a rock shaft 66, while the arms for the units and tens of cents banks are attached respectively to tubes 67 and 68 concentric to the shaft. The shaft 66 and tubes 67 and 68 extend toward the right hand side of the machine. To the right hand end of the tube 67 controlled by the units of cents amount purchased keys is fastened one arm of a yoke-shaped frame 69 (Fig. 12), the other arm of the yoke being pivoted on the shaft 66 and having formed thereon a segment 70. The tube 68 for the tens of cents bank has attached thereto a similar frame bearing a segment 71 while a third segment 72 for the dollars bank is fastened to the shaft 66. The segments 70, 71 and 72 mesh with the teeth of segments 73 (Fig.

8) journaled on a rock shaft 74, which is in axial alinement with the rock shaft 43 previously mentioned. Rigid with each segment 73 is a second segment 75 the purpose of which will be explained later.

From the foregoing description it is apparent that any movement of the operating members 45 controlled by the banks of amount purchased keys will be transmitted directly and positively to the segments 75 and that when the operating members 45 are locked at their zero or any other of their positions the segments 75 will also be locked against movement.

Figure 11:
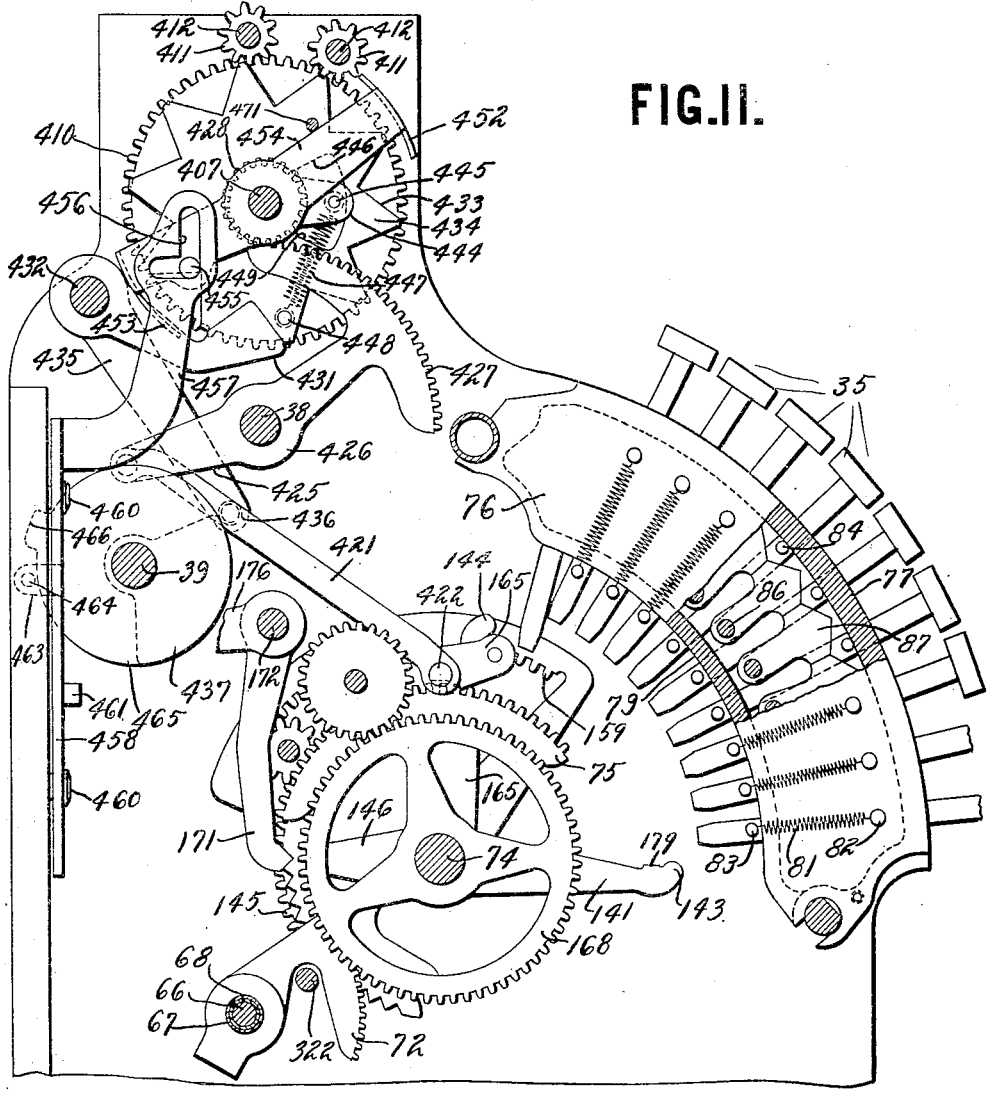
Fig. 11 is a left elevation of the tens of cents bank of amount tendered keys and mechanism controlled thereby, and also shows some of the special indicator operating mechanism.

For each row or bank of amount tendered keys 35 there is provided a supporting frame 76 (Fig. 11). The outer flange 77 of the frame 76 has slots 78 (Figs. 4, 5 and 6) which are enough larger than the shanks of the keys to permit a swinging or oscillatory movement of the keys in the frame in addition to the usual endwise movement of the keys. The flange 79 has no slots but simply contacts the sides of the key shanks and coöperates with a plate 80 attached to the other side of the key frame to limit movement of the keys to a vertical plane.

The amount tendered keys are normally held in undepressed position by springs 81 (Fig. 11) stretched between pins 82 attached to the key frame and cross pins 83 extending through the keys. Outward movement of the keys is limited by cross pins 84 engaging the under side of the flange 77. In their undepressed positions the right hand ends of the pins 83 are seated in notches 85 in the rear edge of the plate 80.

Pivoted on studs 86 attached to the key frame 76 for each amount tendered bank is a set of pawls 87 which are separated by the pin 84 of any key depressed during the fore part of the inward movement of the key, the movement of the pawls being limited in such way as to prevent simultaneous operation of two keys in the same bank.

Coöperating with each bank of amount tendered keys is a rock frame comprising a pair of plates 88 and 89 journaled on the rock shaft 74 and fastened together by rivets 90 (Fig. 13) the rivets being of considerable size so as to give rigidity to the frame. This is necessary because the plate 88 has no lower arm corresponding to the arm 91 (Fig. 4) of the plate 89, said arm being omitted to prevent interference with mechanism described later on. The plates or elements 88 and 89 are provided with bevels 92 terminating in slots or notches 93 with which the pins 83 become engaged when the keys are depressed as shown in Figs. 5 and 6. The elements 88 and 89 form the movable frame hereinbefore mentioned for adjusting depressed keys from one controlling position to another. For convenience this frame will usually be referred to hereafter as the rock frame 89. The mechanism for rocking it will be described in connection with other mechanism controlled by the keys.

The amount tendered keys are locked in depressed position by a detent plate 96 for each bank, having inclined slots 97 to receive the pins 84 carried by the keys. The plate 96 is supported at its lower end by a link 98 pivoted as at 99 to the key frame and at its upper end by an element 102 supported by the pivot 103. As a key is depressed, its pin 84 will elevate the plate 96 thereby preventing depression of a second key in the same bank and rocking the element 102 about its pivot. Coöperating with notches 104 in a rearwardly extending arm 105 of the element 102 is a pawl 106 loosely mounted on a rock shaft 107, the pawl being constantly under the tension of a spring 108, stretched between an arm 109 rigid with the pawl and a rod 110 supported at its ends by arms 111 fast to the rock shaft 107. As the plate 96 is elevated by depression of a key the upper notch 104 is carried up out of engagement with the nose of the pawl 106 and after the tooth 112 passes the nose of the pawl the spring 108 will cause the pawl, as it enters the lower notch 104, to cam the arm 105 upward, thereby raising the detent plate 96 an additional step to engage the locking portion 113 of the slots in the plate with the key pins 84.

The pawls 106 are locked in engagement with the notches 104 at the beginning of an operation and withdrawn at near the end of an operation by movement of the arms 111 and the cross rod 110. This movement is imparted by an arm 121 (Fig. 4) fastened to the rock shaft 107 and carrying an anti-friction roller 122 projecting into a cam groove 123 formed in the side of a disk 124 attached to the driving shaft 38. The shape of the cam groove is such that at the beginning of an operation the rod 110 is swung forward to prevent disengaging the pawls 106, while at near the end of the operation the rod is swung rearward far enough to engage shoulders 125 on the pawls and withdraw the pawls from the notches 104. At about the same time the transverse bar 126 of a yoke loosely mounted on the shaft 107 and extending the width of the amount tendered key banks is carried into engagement with shoulders 127 on the elements 102 and swings the elements 102 back toward their original positions far enough to disengage the locking portions 113 of the slots in the detent plates 96 from the pins 84 of depressed keys and carry the points of the teeth 112 below the points of the pawls. Outward movement of the keys under the action of their springs 81 will then cause the key pins to act against the inclined portions 97 of the slots in such a way as to cam the detents 96 back to their lower or original positions. The yoke 126 is then restored to its normal position and the rod 110 swung forward to permit the pawls 106 to reëngage the upper notches 104 in the elements 102 and aline the detent plates 96.

In order to rock the yoke just mentioned to carry its transverse bar into and out of engagement with the portions 127 of the elements 102, rigid with the right hand side arm of the yoke is an arm 131 (Figs. 4 and 10), said arm carrying an anti-friction roller 132 projecting into a cam slot 133 in the side of a disk 134 attached to the driving shaft 38. The configuration of the cam groove is such that the transverse bar 126 will be held stationary until near the end of a rotation of the driving shaft when the bar will be rocked, as previously described, to release the keys.

For each bank of amount tendered keys there is provided a zero stop 130 for the differential mechanism. This zero stop is normally in effective position but is withdrawn by depression of any key in the bank. The zero stop for the tens of cents amount tendered bank is shown in normal position in Fig. 4. In the normal position its pin 135 corresponding to the pins 83 in the keys is in engagement with the top-most notches 93 in the plates 88 and 89. At near its upper end the zero stop is provided with a pin 136 projecting laterally through a slot 137 in the plate 80 fastened to the key frame. Engaging the protruding end of the pin 136 is a slot 138 in one arm of a bell crank 139 pivoted as at 140 to an upwardly extending portion 141 of the plate 80. A downwardly extending portion 142 of the bell crank 139 carries a pin 143 engaging a slot 144 in the detent plate 96. It is apparent that when the detent plate is raised by depressing a key as above described the bell crank 139 will be rocked counter clockwise (Fig. 4) about its pivot 140, thereby withdrawing the zero stop 130 from engagement with the notch 93 and engaging its pin 135 with the uppermost notch 85 in the stationary plate 80, as shown in Fig. 5. When the key is released and the detent plate 96 again lowered the zero stop will of course be again moved back into engagement with the plates 88 and 89, that is, to the position shown in Fig. 4.

As will appear more clearly later on, the borrowing movement hereinbefore mentioned may be transmitted from the lowest to the highest order amount tendered differential mechanism by movement of the rock frames 89 and it is in order to permit such an operation that the zero stops are normally engaged with the rock frames 89 so that when a frame is rocked the zero stop and the differential mechanism which is at the time controlled thereby may be given a step of movement from the normal zero to what may be called a neutral position. This is necessary because of the fact that the borrowing movement is transmitted from one differential section to another by a movement either of the operated keys or by movement of the zero stop in any bank in which no key has been depressed.

Each bank of amount tendered keys controls the differentially adjustable mechanism through a pair of complementarily movable arms 141 and 142 (Fig. 7). At the beginning of an operation these arms are brought together so that their portions 143 and 144 respectively are in engagement with the inner end of the depressed key or the zero stop in case no key has been operated. The mechanism for imparting the complementary movements to the arms will now be described. Rigid with the arm 141 is a segment 145 the arm and segment forming a unit loosely mounted on the rock shaft 74. Rigid with the arm 142 is a similar segment 146 the arm 142 and segment 146 also forming a single element journaled on the shaft 74. The shaft 74 is, as before stated, in axial alinement with the rock shaft 43 for the amount of purchase banks a separate shaft being employed because the shafts 43 and 74 have rather different movements. The shaft 74 is rocked at each operation by a pitman 151 (Fig. 10) loosely connected at its forward end to an arm 152 fastened to the rock shaft 74. At its rear end the pitman is slotted to straddle the shaft 39 and carries an anti-friction roller 153 projecting into a cam groove 154 in the side of a disk 155 attached to the driving shaft 39. The shape of the cam groove is such that during the first half of the rotation of the shaft 39 the rock shaft 74 will be gradually rocked clockwise (Figs. 4, 7 and 10) and then restored to normal position during the latter part of the rotation. Attached to the rock shaft 74 is an arm 157 (Fig. 7) for each bank of amount tendered keys. Pivoted to the side of each arm at near its upper end is a pinion 158 the teeth of which are constantly in mesh with the teeth of the segment 145 for the arm 141. At its opposite side the teeth of the pinion 158 are in mesh with the teeth of an internal segment 159 journaled on the rock shaft 74, the latter teeth being also constantly in mesh with the teeth of a pinion 160 journaled on a stationary rod 161. The teeth of the pinion 160 are also constantly in mesh with the teeth of the segment 146 for the arm 142. When the shaft 74 is rocked as above described the arm 157 will be swung clockwise (Fig. 7). This will cause clockwise movement of the segment 145 and arm 141 until the arm is stopped by the depressed key, after which the pinion 158 will rotate about the segment 145 and drive the internal segment 159, the pinion 160 and the segment 146 to swing the other arm 142 into engagement with the end of the depressed key. The cam groove 154 will then hold the shaft 74 and arms 157 stationary for a short time thereby holding the points 143 and 144 of the arms 141 and 142 in contact with the depressed key 35. When the shaft 74 and arms 157 are rocked back to their first positions the arms 141 and 142 are again separated and moved back to the normal positions in which they are shown in the drawings.

For each bank of amount tendered keys there is provided a pivoted plate 165 (Fig. 8) journaled on the rock shaft 74. Each of these plates 165 has pivoted to its side a pair of rigidly connected gears 166 and 167 the teeth of the former engaging the teeth of the segment 75 hereinbefore described and the teeth of the latter engaging the teeth of a main differential or ejector controlling gear 168 loosely mounted on the shaft 74. The plates or elements 165 are normally locked against movement by locking arms 171 attached to a rock shaft 172, but at the beginning of an operation this shaft is rocked to withdraw all of the arms 171 from engagement by a cam groove 173 in the side of a disk 174 attached to the driving shaft 39, said cam groove coöperating with an anti-friction roller 175 carried by an arm 176 rigidly mounted on the shaft 172. The locking arms 171 are not restored to locking engagement until toward the end of the operation by which time all of the differential mechanism will have been adjusted.

Each of the elements 165 is provided with a stud 177 projecting laterally into the path of the complementarily movable arms 141 and 142. It is clear that as the arms in question are brought together until stopped by the depressed key the shoulders 178 and 179 on the arms will engage the stud 177 and move the element 155 from one position to another. At the time the element 165 is so moved the segment 75 is either held stationary by the operating member 45 for the corresponding amount purchased bank or is being moved back to its starting point as the member 45 is adjusted to its zero position. As the element 165 is rotated by operation of the arms 141 and 142 the gear 166 will rotate about the segment 75 thereby causing the gear 167 to drive the main differential gear 168 clockwise (Figs. 7 and 8) to a position corresponding to the amount tendered key operated. The arms 141 and 142 then hold the element 165 stationary for a short time during which the segment 75 is driven by adjustment of the operating member 45 for the connected amount purchased bank thereby reversely rotating the gears 166 and 167 and turning the main differential gear 168 in the direction opposite to that in which it was just adjusted by the arms 141 and 142, that is, counter clockwise (Figs. 7 and 8), the extent of this second movement coresponding to the amount purchased key operated so that at the end of the two movements the gear 168 will be at a position representing the difference between the values represented by the two controlling keys operated. It will, of course, be understood that a main differential gear 168 may be operated only in accordance with the amount tendered key depressed or it may be operated only in accordance with the amount purchased key operated, that is to say, it is not necessary for a key to be depressed in each of the two banks associated with one gear. In case the main differential gear 168 is adjusted under the control of amount tendered keys only it is advanced from "0" through "1" to a position corresponding to the key operated while if said gear is adjusted only under the control of an amount purchased key it is reversely rotated by the segment 75 from "0" through "9" to a position corresponding to the amount purchased key operated.

If a main differential gear 168 has to be set back one step to effect ejection of the proper coins this backward step of movement is, as before indicated, effected by adjusting the key or zero stop with which the complementarily movable arms 142 are in engagement from the first controlling position to a second controlling position, that is, the position of next lower value. This movement is transmitted through the arms 141 and 142 and the stud 177 to the element 165 after the segment 75 has been moved to adjusted position, thereby causing a step of rotation of the gears 166 and 167 in the proper direction to rotate the main differential gear 168 a step in the amount purchased direction. That is to say, the effect is to subtract "1" from the value previously set up on the gear.

The mechanism for effecting this backward step of movement is best shown in Fig. 4. Rigid with each of the main differential gears 168 for the units and tens of cents bank is a disk 181 in the side of which is formed a cam slot engaging an anti-friction roller 182 carried by an arm 183 pivoted as at 184 to the side of the plate 89 forming a part of the rock frame for the next higher order key bank. When the main differential gear is first advanced under the control of an amount tendered key the portion 185 of the cam slot in the disk 184 is carried into engagement with the anti-friction roller 182. This portion of the slot is concentric to the shaft 74 so that no movement of the arm 183 will be effected. If, however, the main differential gear is then adjusted far enough in the opposite direction to more than offset the movement previously given to the gear or if an amount purchased key only is operated, the cam portion 186 of the slot in the disk 181 will be carried past the anti-friction roller 182 thereby rocking the arm 183 downward. Of if the machine is operated with no key depressed in the bank but amounts set up on the other banks requiring a borrowing operation the cam disk 181 will simply be moved from the normal position in which it is shown to carry the cam portion 186 past the roller 182 thereby also effecting downward movement of the arm 183. In either event an arm 187 rigid with each arm 183 will be thrown up to disengage the shoulder 188 formed thereon from a locking bar 189 extending the width of the amount tendered differential mechanism and carry a shoulder 190 on the arm up into a position to be engaged by a shoulder 191 formed on the periphery of a disk 192 attached to the driving shaft 39. When a shoulder 191 engages the shoulder 190 the frame 89 will be drawn rearward thereby swinging the zero stop or the depressed key in the associated bank from its first to its second controlling position. The shoulder 188 will then drop behind the bevel portion 193 of the locking bar 189 and will be held in that position by the portion 194 of the disk 192 riding above the upper end of the shoulder 190. Just at the end of the operation the portion 194 of the disk 192 will be carried out of engagement with the shoulder 190 to free the lever 187 and at the beginning of the next operation the rock frame and lever 187 are restored to normal position by a bell crank 195 journaled on the shaft 172. The downwardly extending portion of the bell crank has an anti-friction roller 196 projecting laterally into a slot 197 in the right hand plate 89 of the rock frame. The rearwardly extending portion 198 of each bell crank curves upward into the path of the shoulder 199 on the periphery of a disk 200 fastened to the driving shaft 39. As soon as the driving shaft begins its rotation the shoulder 199 will engage the bell crank 195 and rock it clockwise (Fig. 4) thereby rocking the rock frame back to its original position and drawing the lever 187 forward until the shoulder 188 thereon is in front of the locking bar 189. In order to permit this movement even though the disk 181 may be held in one of its amount purchased positions by the connected operating member 45, the cam slot in the disk is widened as shown at 202 to prevent interference with the roller 182. It should of course, be understood that the disks 192 are so positioned on the shaft 39 that their shoulders 191 operate successively from lower to higher order to permit borrowing all the way across the machine.

Change making mechanism.

Figure 2:
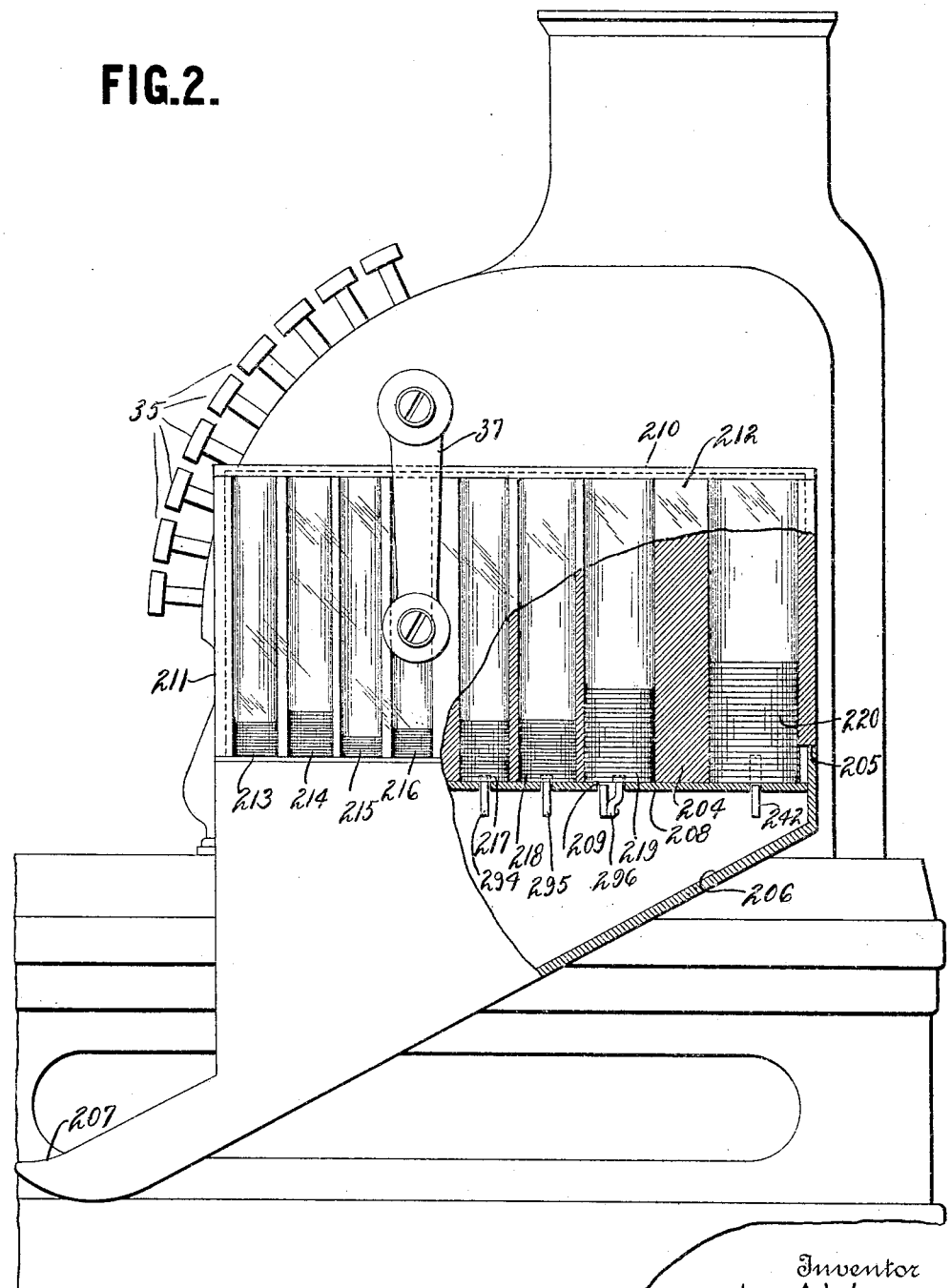
Fig. 2 is a right elevation of the improved machine with the outside casing and the coin tube frame partly broken away to show the manner in which some of the coin ejectors coöperate with their coin tubes.

The coin tubes from which change is ejected are located at the right hand side of the machine. The tubes are formed in a removable frame 204, arranged to rest upon the casing of the machine as shown at 205. (Fig. 2). Each of the tubes is so shaped as to partially surround the coin stack leaving an opening through which the contents of the tube may be seen. At the bottom the tubes are arranged to permit ejection of coins into a chute 206 terminating in a coin cup 207 at the bottom of the chute. Fastened to the bottom of the coin tube frame 204 is a plate 208 supporting the coin stacks and having slots 209 through which operate the ejectors for the various tubes.

Fitting over the coin tube frame 204 is a removable hood comprising a top member 210 and a side member 211 the latter containing a glass plate 212 through which the coins are visible. Any suitable means for holding or locking the hood and frame in position may be employed. The top plate 210 may, if desired, be provided with slots through which additional coins may be inserted without its being necessary to first remove the hood.

As previously stated, eight coin tubes are employed, two for the pennies, two for the dimes, one for the five cent pieces, one for the twenty-five cent pieces, one for the half dollars and one for the dollars. The penny tubes are designated by the numerals 213 and 214, the dime tubes by the numerals 215 and 216, the tube for the five cent pieces by the numeral 217, the tube for the quarters by the numeral 218, the tube for the half dollars by the numeral 219, and the tube for the dollars by the numeral 220. The construction is such that if a single penny is to be ejected it will be ejected from tube 213, if two pennies are to be ejected, one will be ejected from tube 213 and one from tube 214. If three pennies are to be ejected, two will be ejected from tube 213 and one from tube 214, while if four pennies are to be ejected two will be ejected from each of the penny tubes. Two dime tubes are employed because while it is sometimes necessary to eject two dimes in making change, it is found to be better, on account of the thinness of the coins, to eject one from each of two tubes rather than to employ more complicated mechanism whereby either one or two coins may be ejected from a single tube. It is never necessary, in this machine, to eject more than a single coin from the nickel tube 217, the quarter tube 218 or the half dollar tube 219, but the ejector for the dollar tube is capable of ejecting from one to four dollars depending upon the amounts set up on the keyboard.

From what has just been said, it is clear that the ejectors for the penny tubes 213 and 214 must be differentially adjusted as a preliminary to ejecting movement, this also being true of the ejector for the dollars tube 200. The ejectors for the other five tubes need not be differentially adjustable, in fact in this embodiment of the idea they are always in position to eject coins from their tubes and are always connected to the main driving mechanism. In case no coins are to be ejected from certain of these five tubes their ejectors are autamatically disconnected from the main driving mechanism so that movement of the ejectors is prevented.

All eight of the ejectors are actuated by a rock shaft 225 (Figs. 9 and 13) extending from front to rear under the amount tendered mechanism. This shaft is normally rocked first clockwise and then counter clockwise at each operation and carries a gear 226 for each of the eight coin ejectors. Meshing with each of the gears 226 is a rack 227 fastened to the side of an ejector operating pitman 228. Each time the shaft 225 is rocked the operating pitmen 228 are all given a thrust toward the right and then returned to normal position, thereby unless prevented by the ejector controlling mechanism, driving the ejectors to eject coins.

As previously stated the penny ejectors are both differentially adjustable. These two ejectors are designated in Fig. 10 by the numerals 229 and 230. The first penny ejector, that is, ejector 229 is also shown in Fig. 16. Both ejectors are at all times connected by pivots 233 to their operating pitmen 228 but the ejecting ends of the ejectors normally rest in such a position that if the ejectors were to be reciprocated they could not engage the coins in the tubes 213 and 214. The ejectors 229 and 230 have attached to their sides studs 231 engaging slots 232 in plates 234 slidably supported on the rock shaft 225, a rocking cam shaft 236 and hubs 237 of ejector controlling cams 238 fastened to the penny ejector controlling shaft 240. There is a second controlling cam 239 for each of the penny ejectors. The upwardly extending portion of each plate 234 passes between its pair of cams 238 and 239 and carries oppositely extending rollers 241 and 242 extending across the edges of the cams. The manner in which the cam shaft 240 is differentially rotated will be described later on. It is sufficient at this point to say that as the shaft in question is rotated the cams attached thereto will raise and lower the plates 234 and thereby the penny ejectors 231 and 232 to the proper position to effect ejection of the desired number of coins when the ejectors are reciprocated.

The dollar ejector 242 is also differentially raised and lowered to eject the desired number of coins. Normally it rests in position to clear the bottom coin, this being necessary because the ejector is reciprocated at every operation of the machine. The ejector is at all times connected by a pivot 243 to its invariably moved operating pitman 228 and is supported for endwise movement by pins 244 and 245 extending through slots 246 and 247 in a differentially adjustable plate 248. This differentially adjustable plate is slidably supported by the rock shaft 225, the rocking cam shaft 226 and the dollars ejector controlling shaft 251. Attached to the side of the differentially adjustable plate 248 is an anti-friction roller 252 projecting into a cam groove formed in the side of a disk 253 attached to the dollar shaft 251. The mechanism whereby the dollar shaft 251 is rotated in either direction from the position shown will be described later. All that is necessary at this point is to explain that if the shaft is turned in the amount tendered direction, that is, forward from "0" through "1," the cam portion 254 of the groove in the disk 253 will engage the roller 252 and raise the plate 248 an extent determined by the extent of rotation of the shaft 251. For instance, in the example before used where a $5 bill is tendered in payment for a 50¢ purchase, the disk 253 would be turned five steps to bring the portion 255 of the cam groove in engagement with the roller 252. If now, the ejector 242 could be operated the result would be to eject five coins from the dollar tube 220. It will be recalled, however, that the main differential gear for the dollars ejectors was first turned back a step so that the roller 252 would then be at about the portion 256 of the cam slot. In this position the coin engaging end of the ejector 242 will be at its proper position to eject four dollars from the tube.

If in entering a transaction such as just mentioned the fifty cent amount should accidentally be set up on the amount tendered keys and the $5 item on the amount purchased keys the effect would be to cause rotation of the shaft 251 backward from "0" through "9" to the "5" position thus carrying the concentric portion 261 of the groove in the disk 253 into engagement with the roller 252 and holding the ejector 242 in its normal ineffective position. As will be explained later, if the shaft 251 is through any kind of a misoperation rotated backward to bring the portion 261 of the cam groove into engagement with the roller 252 another cam carried by the shaft 251 will operate mechanism to disconnect the ejector operating shaft 225 from the main operating mechanism, thereby disabling all eight of the ejectors.

The two ejectors for dimes, the ejector for nickels, the ejector for quarters, and the ejector for half dollars are, as previously stated, always in a position where they will eject a single coin from their respective tubes in case they are operated. It has also been pointed out that these five ejectors are normally connected to the main driving mechanism and are disconnected in case the making of change does not require their operation. In Fig. 13 is shown the ejector 271 for ejecting dimes from the first dimes tube 215. The ejector is slotted to engage the shafts 225 and 236 the slots permitting a rectilinear reciprocating movement of the ejector. The operating pitman 228 for the ejector has a lug 272 formed thereon projecting laterally into a notch 273 in the upper edge of the ejector. Attached to the side of the rack 228 is a stud 274 coöperating with a slot 275 in a bell crank 276. It is apparent that if the bell crank 276 should be rocked clockwise (Fig. 13) the lug 272 on the pitman or rack 228 will be disengaged from the notch 273, thereby preventing the pitman from moving the ejector when the former is reciprocated. The bell crank 276 is loosely mounted on an eccentric 278 fast to the shaft 236. The shaft 236 is rocked at each operation first clockwise and then counter clockwise, thereby raising the bell crank 276 upward, and then restoring it to its first position. The upwardly extending arms 281 and 282 of the bell crank have oppositely extending rollers 283 and 284 extending across the edges respectively of controlling elements 285 and 286 fastened to the ejector controlling shaft 287. The controlling elements 285 and 286 each carries on its periphery four stops 289. The elements are so disposed with reference one to the other that if when the bell crank 276 is raised by the eccentric 278 a stop 289 on the element 285 is in the path of the roller 283, the roller 284 will enter one of the recesses in the periphery of the element 286. As a result the bell crank will be rocked clockwise (Fig. 13) to disconnect the pitman 228 and ejector 271. If, on the other hand, the roller 284 engages a stop 289 on the element 286 the bell crank will not be rocked and the connection between the pitman 228 and the ejector will not be disturbed.

In case the bell crank is rocked clockwise to disable the connection, a roller 291 attached to the side of the bell crank passes in front of the curved portion 292 on the lower edge of the ejector thereby coöperating with the shaft 225 to prevent endwise movement of the ejector in either direction. When the eccentric 278 is turned back to its original position a roller 293 attached to the bell crank coöperates with the upper edge of the ejector in such a way as to cause anticlockwise movement of the bell crank 276 to reëngage the shoulder 272 on the operating pitman with the notch 273 in the ejector.

Figure 21:
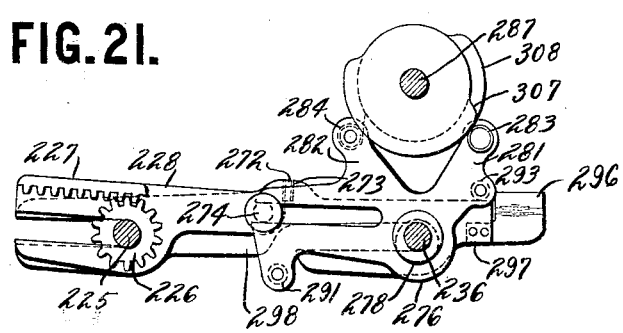
Fig. 21 is a detail of the controlling elements and ejecting devices for the tube containing the fifty cent pieces.

While the description just given refers particularly to the first dimes ejector, that is, the one for the dimes tube 215, it applies equally well to the operating and controlling mechanism for the second dimes ejector 2931, the ejector 294 for nickels, and the ejector 295 for quarters. The half dollar ejecting mechanism is the same as the other four just mentioned except that in order to clear some of the operating devices of the machine the ejecting end 296 (Figs. 4 and 21) is a separate plate formed as at 297 to coöperate properly with the coin tube 219 and rigidly attached to the side of the main ejector plate 298. The first dimes ejector controlling elements 285 and 286, the controlling elements 301 and 302 for the second dimes ejector, the controlling elements 303 and 304 for the nickel ejector, the elements 305 and 306 for the twenty-five cent piece ejector and the elements 307 and 308 for the half dollar ejector are all attached to the same differentially rotatable shaft 287, and the position to which said shaft is turned determines the coin or coins to be ejected by the ejectors controlled by elements thereon.

The shaft 240 controlling the ejection of pennies is rotated by the units of cents main differential gear 168. Meshing with the units differential gear 168 is a gear 311 (Fig. 8) attached to a shaft 312. Attached to the shaft at near its right hand end is a spiral gear 313 (Figs. 10 and 13) the teeth of which are at all times in engagement with the teeth of a spiral gear 314 fastened to the shaft 240. It will be recalled that the main differential gears 168 are controlled jointly by the key banks of the same denomination so that in the instance now under consideration shaft 240 will be moved in either direction according to the keys operated in the units of cents bank of amount tendered keys and the keys operated in the units of cents bank of amount purchased keys. That is to say, the shaft may be differentially adjusted in the amount tendered direction and then reversely rotated in the amount purchased direction if keys are operated in both banks or it may be adjusted only in one or the other of the two directions if a key should be operated in one of the units banks and not the other.

The dollars ejector controlling shaft 251 is operated directly from the main differential gear 168 controlled jointly by the dollars banks of amount tendered and amount purchased keys. Meshing with the dollars main differential gear 168 is a gear 321 attached to a shaft 322. Attached to the shaft 322 at near its right hand end is a spiral gear 323 the teeth of which are constantly in engagement with the teeth of a spiral gear 324 fastened to the shaft 251. Through this connection movements of the dollar differential gear 168 in either direction are transmitted directly to the shaft 251 so as to differentially control the ejection of dollars or the disabling of all of the ejectors.

The shaft 287 carrying the controlling elements for the dimes, nickels, quarters and half dollars is in axial alinement with the shaft 251 for the dollars ejector and is rotated by the gear 168 controlled jointly by the tens of cents amount tendered and tens of cents amount purchased key banks. Meshing with the main differential gear 168 for the tens of cents banks is a gear 331 attached to a shaft 332 to which is fastened a spiral gear 333, the teeth of which are at all times in engagement with the teeth of a spiral gear 334 (Fig. 14). The latter gear is rigidly attached to a hub 335 loose on the shaft 287 and having a cut 336 coöperating with a shoulder 337 on a collar 338 fastened to the shaft. It is clear that the gear 334 and its hub 335 may be moved endwise of the shaft to a certain extent and still maintain an unbroken driving connection with the shaft. The purpose of this is to provide a means whereby the shaft 287 may be given a movement relative to the differential mechanism for operating it.

Figure 22:
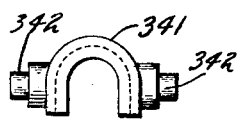
Fig. 22 is a side elevation of the hood for moving the spiral gear on the tens of cents ejector controlling shaft to impart a half step of moveemnt to said shaft.
Figure 23:
Fig. 23 is a bottom view of the same hood as shown in Fig. 22.

This relative movement of the shaft 287 is imparted by the penny shaft 240 in case the penny shaft should be rotated in either direction to a position calling for the ejection of more than four cents in change. Partially surrounding the gear 334 is a small hood 341 (Figs. 13, 14 and 22) having oppositely extending trunnions 342 journaled in the lower ends of arm 343 and 344 of a yoke 345 pivoted at its upper end on a stud 346 attached to the right hand frame of the machine. The arm 342 of the yoke carries an anti-friction roller 347 projecting into a cam groove formed in the periphery of a disk 348 attached to the penny shaft 240. If the shaft 240 is turned in the amount tendered direction, that is, clockwise (Figs. 13, 16 and 17) the yoke 345 will be held stationary until the disk 348 passes from the four to the five cent position. As it passes from the four to the five cent position the portion 351 of the cam groove will engage the roller 347 and swing the yoke to the right (Fig. 14) thereby sliding the gear 334 along the shaft 287. This movement of the gear because of the fact that rotation of the gear relative to the shaft is prevented by coöperation of the shoulder 336 and notch 337 will cause the spiral teeth of the gear 332 to turn the gear 334 and thereby the shaft 287 one-twentieth of a rotation or one-half of a step so that if, for example, seven cents in change was required the shaft 287 will have been turned far enough for all of the ejectors controlled by said shaft to be disconnected from the main driving mechanism except the ejector for the nickel coin tube. At the same time the shaft 240 will have been positioned properly to control the ejection of a penny from each of the penny tubes. In case the shaft 240 should be moved in the amount purchased direction, that is, backward from "0" through "9," the first movement of the shaft will carry the portion 353 of the cam slot into engagement with the roller 347 thereby immediately turning the shaft 287 ahead a half step and holding it in that position with reference to its differential mechanism until the disk 348 has been turned to a point lower than its "5" position. As it passes from its "5" to a lower position the portion 351 of the cam will engage the roller 347 and restore the gear 334 and shaft 287 to normal relation with the tens of cents differential mechanism.

Figure 10:
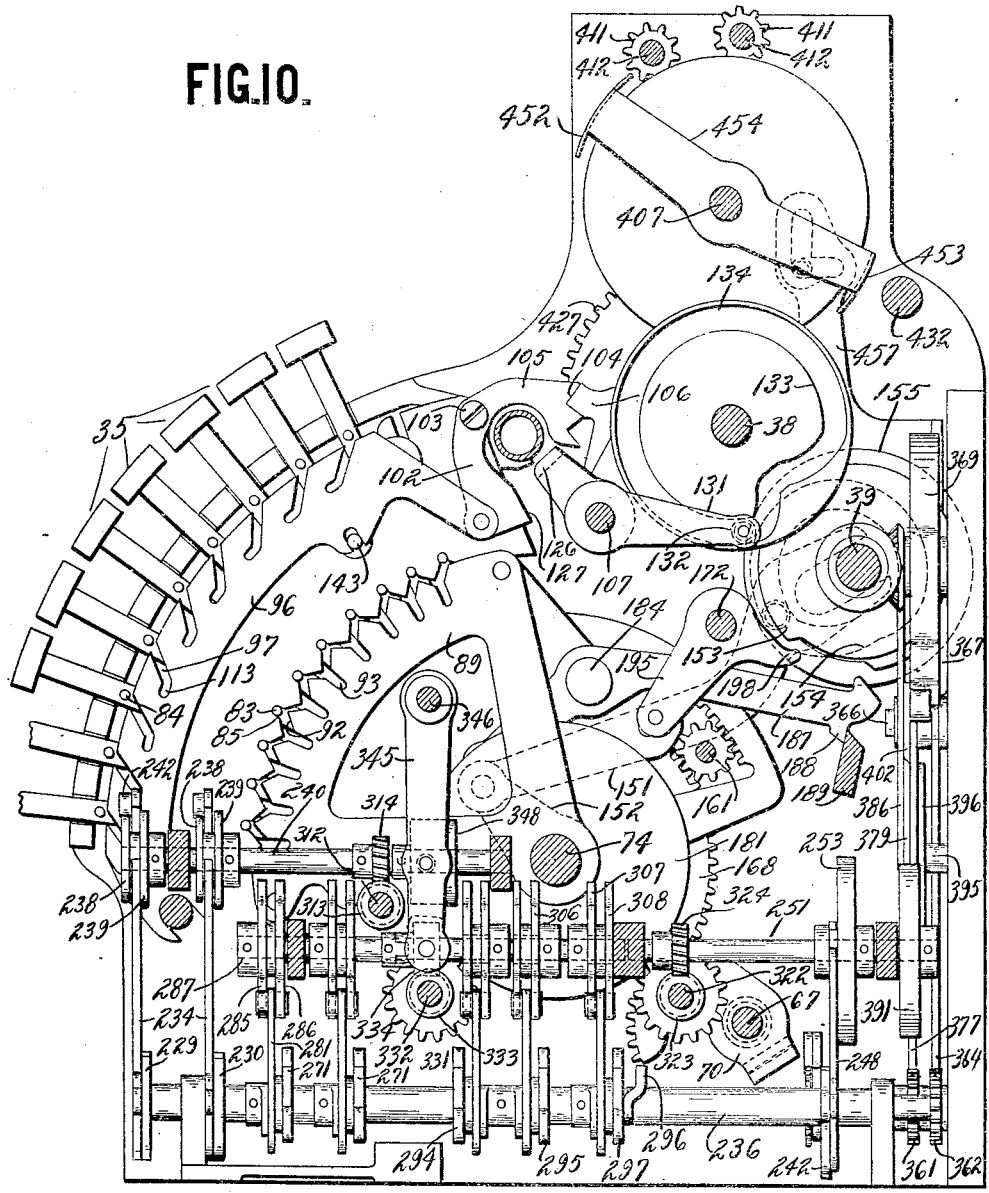
Fig. 10 is a section taken between the units of cents amount tendered key bank and the right side frame of the machine. Some of the differential mechanism for the units of cents banks has, however, been omitted for the sake of clearness.

The mechanism for rocking the ejector operating shaft 225 and the eccentric or cam shaft 236 is best shown in Figs. 9 and 10. Attached to the rear ends of these two shafts are gears 361 and 362. Meshing with the teeth of the gear 362 is a segment gear 363 formed on the lower end of an arm 364 of a lever 365 journaled on a stud 366 attached to the rear frame of the machine. The upper arm 367 (Fig. 10) of the lever 365 carries an anti-friction roller (not shown) projecting into a cam groove 368 (Fig. 9) formed in the rear side of a disk 369 journaled on a stud 370 secured to the rear frame of the machine. The arm 367 cannot be seen in Fig. 9 as it is in alinement with an arm 371. Rigid with the disk 369 is a bevel gear 372 meshing with a bevel gear 373 fastened to the driving shaft 39. At each rotation of the driving shaft the disk 369 makes a complete rotation counter clockwise (Fig. 9) thereby rocking the lever 365 and causing the segment 363 to rotate the shaft 236 a half of a rotation clockwise and hold it in the rotated position for a short time after which the shaft is rotated counter clockwise to its first position. This rocking movement of the shaft 236 raises the bell cranks 276 to disconnect ejectors which are not to operate and holds them disconnected while the other ejectors are reciprocated to eject coins. The bell cranks are then returned to their original positions to reëngage the operating pitmen 228 with the ejectors.

The rock shaft 225 is normally rocked first clockwise (Fig. 9) and then counter clockwise at each operation to reciprocate the eight ejector driving pitmen 228, the rocking movement being imparted by a segment 376 on the lower end of an arm 377 forming part of a three-armed element 378 journaled on the stud 366. Adjacent the element 378 is a plate 379 having an open slot 380 at its upper end engaging the stud 366. At its lower end the plate carries a stud 381 projecting into a slot 382 in the arm 377 and at a point intermediate its length said plate carries an anti-friction roller 383 extending through a second opening 384 in the arm 377. Pivoted on the stud 366 is a short lever 385 having a notch in its lower end normally in engagement with a stud 386 fastened to the plate 379. The upper arm 371 of the lever 385 carries an anti-friction roller 387 projecting into a cam groove 388 formed in the forward side of the disk 369. The cam groove 388 is so shaped that just at the end of an operation or after the eccentric shaft 336 has been rocked to disconnect the ejectors controlled by the tens of cents shaft, the segment 376 will be operated to rotate the shaft 225 first clockwise and then anti-clockwise thereby reciprocating all eight of the ejector operating pitmen 228.

In case the machine is operated with an amount on the amount purchased keys exceeding the amount on the amount tendered keys the plate 379 is lowered so as to disengage the stud 386 from the notch in the lower end of the lever 385. This, it is clear, will prevent movement of the segment 376 when the lever 385 is rocked by the cam groove 388. The mechanism for so lowering the plate 379 is controlled by the dollars ejectors controlling shaft 251. Attached to said shaft is a disk 391 in the rear side of which is formed a cam groove coöperating with an anti-friction roller 392 attached to the side of the downwardly extending arm 393 of a bell crank 394 pivoted on a stud 395 attached to the rear frame of the machine. The other arm 396 of the bell crank passes to the rear of the three-armed element 378 and is provided with a bayonet slot surrounding the projecting end of the anti-friction roller 383 carried by the sliding plate 379. The disk 391 is shown at the zero position in Fig. 9 and if it is rotated from this position in the amount tendered direction, that is clockwise, the concentric portion 397 will coöperate with the roller 392 and hold the bell crank 394 stationary. However, if the disk is rotated in the opposite or amount purchased direction as it passes from the "0" to the "$5" position the cam portion 3981 of the groove in the disk will engage the roller 392 and swing the bell crank 394 counter clockwise (Fig. 9) on its pivot. This will cause the portion 398 of the slot in the arm 396 of the bell crank first to engage the anti-friction roller 393 and then slide the plate 379 down far enough to disengage the stud 386 from the notch in the lower end of the operating lever 371 and move the stud 381 to the bottom of the slot 382. Then when the lever 371 is rocked by the cam 388 the segment carrying arm 377 will not be affected, and the shaft 225 will consequently not be moved. The portion 398 of the slot in the arm 396 will hold the three-armed element 378 against displacement until the bell crank 394 is rocked back to the position shown to reëngage the stud 386 with the notch in the operating lever 385. The portion 399 of the bayonet slot is simply to permit movement of the element 378 in the ordinary coin ejecting operation.

The member 378, as will appear clearly later on, is at all times under the tension of a spring 401 tending to rock the member in a counter clockwise direction. This might interfere with the easy working of the sliding plate 379 and the other connecting and disconnecting mechanism associated therewith. To prevent any such condition an arm 402 of the three-armed element is provided with a roller 403 riding on the edge of the disk 369 in such a way as to neutralize the effect of the spring 401 during the greater part of an operation. A clearance cut 404 in the periphery of the disk prevents interference with the ordinary movements of the member 378 to operate the change ejectors.

Indicating mechanism.

The indicators for indicating the value of a coin or bill tendered are above the amount tendered key banks and are arranged to indicate through an opening 405 (Fig. 1) at the front of the machine, and a similar opening (not shown) in the rear of the casing. The indicator 406 (Fig. 9) for indicating units of cents is loose on a shaft 407 and has two series of digits running in opposite directions around the periphery and arranged in such a way that when, for example, the digit "9" is displayed at the front the same digit will appear at the rear. The indicators 408 and 409 for indicating respectively the tens of cents and the dollars at the front of the machine are also loose on the shaft 407. Both indicators 408 and 409 have attached to their sides gears 410 meshing with pinions 411 fastened to shafts 412 (Fig. 11) said shafts carrying other pinions meshing with gears 413 attached to the sides of the tens of cents indicator 414 and dollars indicator 415 for indicating at the rear of the machine. It is apparent of course, that any movement imparted to the indicators 408 and 409 will be transmitted through the shafts 412 directly to the corresponding indicators 414 and 415.

All of the amount tendered indicators are moved from the position at which they were left at the end of the preceding operation directly to positions corresponding to the amount tendered keys depressed when setting up the value of the coin or bill at the beginning to a new operation. The driving movement is imparted to the indicators through links 421 pivoted at one end of the reduced portions 422 (Fig. 8) of studs 423 (see also Fig. 9) fastened to the sides of the members 165. The studs 423 are cut out as shown at 424 to clear the segments 75. The other ends of the links are pivotally connected to arms 425 of segments 426 pivoted on the shafts 38. The teeth 427 of the segments 426 mesh with the teeth of pinions 428 rotatably mounted on the shaft 407. It is apparent that when the elements 165 are adjusted by movement of the complementarily movable arms 141 and 142 the segments 426 will be adjusted directly to corresponding positions and that this will effect a corresponding extent of rotation of the gears 428.

All of the amount tendered indicators are normally locked against movement by alining arms 431 (Fig. 11) fastened to a rock shaft 432 and engaging notches 433 in plates 434 attached to the sides of the indicators 406, 408 and 409, the indicators 414 and 415 being of course held against movement by the pinions on the shafts 412. Rigid with the shaft 432 is an arm 435 carrying an antifriction roller 436 normally resting on the edge of a cam 437 fastened to the driving shaft 39. At the beginning of a rotation of the shaft 39 the cam 437 will be carried out of contact with the roller 436 allowing the arms 435 and 431 to drop, thereby disengaging the latter from the notches 433 to free the indicators. This movement of the arms 435 and 431 may be made a little quicker if desired by employing a spring, although the weight of the parts is sufficient to effect a proper operation. During the latter part of the rotation of the shaft 39 the cam 437 will engage the roller 436 and swing the arms 431 back into locking engagement with the plates 434.

It will be recalled that after the elements 165 are positioned by the complementarily movable arms said arms and elements may be given a unitary step of movement backward by operation of the rock frames 89 to borrow from higher orders. Before this occurs the cam 437 will have engaged the roller 436 and locked the indicators against movement. It is clear that some sort of a connection must be provided which will permit a step of movement of the segments 426 independently of the indicators as the segments are positively connected to the elements 165. For this purpose the pinions 428 are not rigidly attached to the indicators 406, 408 and 409 as may have been inferred from the preceding description, but each pinion has fastened thereto an arm 444 (Fig. 11) these arms carrying studs 445 projecting laterally through openings 446 in the alining plate 434, gears 410 and the sides of the indicators. Stretched between the studs 445 and studs 448 attached to the inner sides of the indicators are springs 447. Normally the studs 445 are in engagement with the edges 449 of the openings 446 so that the pinions 428, arms 444, and the indicators move as units. If, after the indicators are locked by the alining arms 431, the rock frames 89 are called into play to impart a step of movement, the springs 447 will be stretched as the arms 444 are moved to the position shown in Fig. 11. It is clear that the springs 447 afford a connection between the differential devices and the indicators whereby the differential devices may be moved independently of the indicators and that as soon as the locking arms 431 are released the springs will restore the indicators to normal relation with their differential devices.

Special indicators.

As hereinbefore stated, when the main coin ejecting shaft 225 is disconnected from the driving mechanism by operation of the sliding plate 379, a special indicator is set calling attention to the fact that the machine has been operated either with an amount on the amount of purchase keys only or with an amount on the purchase keys in excess of that on the amount tendered keys. This special indicator is controlled by a third arm 451 of the three-armed element 378. The special indicator, as shown in Fig. 11, comprises two plate 452 and 453 long enough to cover the amount tendered indicators at the front and back of the machine. These plates are supported by side members 454 pivoted on the shaft 407 at either side of the amount tendered indicators. Attached to the left hand member 454 is a stud 455 projecting through a bayonet slot 456 in the upper end of an arm 457 formed on a plate 458 having slots 459 (Fig. 9) through which extend studs 460 secured to the rear frame of the machine the arrangement being such that the plate 458 has a sliding vertical movement. Attached to the plate 458 is a stud 461 resting upon the portion 462 of the arm 451 of the three-armed element 378. Rigid with the plate 458 and extending rearwardly through an opening (no shown) in the rear frame of the machine is an arm 463 carrying a stud 464. Fastened to the driving shaft 39 is a disk 465 on the periphery of which is a shoulder 466. When the three-armed element is disconnected from the driving mechanism and held stationary as hereinbefore described, the plate 458 will be held in the position shown in Figs. 9 and 11 and at near the end of a rotation of the driving shaft the shoulder 466 will engage the stud 464 and slide the plate 458 upward, thereby swinging the special indicator plates 452 and 453 in front of the amount tendered indicators.

When the machine is correctly operated the special indicator is of course not exposed. This is accomplished by lowering the plate 458 to a point where the shoulder 466 will clear the stud 464 as the disk 465 is turned. Downward movement of the plate 458 is effected by the spring 401 when the arm 451 is carried down by the normal coin ejecting counter clockwise movement of the three-armed element 378. This downward movement of the plate 458 does not affect the position of the special indicator because of the clearance afforded by the vertical portion of the slot 456 in the arm 457. A pin 471 (Fig. 11) fastened to the adjacent machine frame prevents the special indicator from turning during downward movement of the arms 457, the purpose of the pin being, of course, to prevent the plate 452 from engaging the pinions 414. When the three-armed element 378 is returned to its original position at near the end of the operation the plate 458 will be again raised, but this will occur after the shoulder 466 on the disk 465 has been turned past the position where it would engage the stud 464.

It is, of course, apparent that the plates 452 and 453 may carry any suitable wording such as "Insufficient amount received" or the plates may simply be blank and given some distinctive color. All that is necessary is to provide something in the way of wording or coloring that will attract attention to the misoperation.

Operation.

In explaining the construction of the mechanism it has been found necessary incidentally to explain more or less in detail the operation of the various features and a lengthy restatement of the operation is thought to be unnecessary here. However, a brief summary of just what occurs in a typical change making operation may be of advantage.

Suppose, for example, that a sale of 25¢ has been made and a dollar tendered in payment. The operator will first depress the five cent and the twenty cent keys in the units and tens of cents banks of amount purchased keys and the dollar key in the amount tendered section of the keyboard. As the dollar key is depressed it will be engaged with the rock frame 89 for the dollar bank. The operating handle 37 is then turned. During the forepart of the movement of the handle the operating members 45 for the amount purchased banks will be restored from any previously adjusted positions to their normal starting points, or if already at such starting points they will simply be held stationary. During the same time the shaft 74 of the amount tendered mechanism will be rocked, thereby causing the arms 157 (Fig. 7) and pinions 158 to bring the three pairs of complementarily movable arms 141 and 142 together until the said arms are in engagement respectively with the zero stops 130 for the units and tens of cents banks and with the depressed dollar key in the dollar bank. The pairs of arms are then held in engagement with the zero stops and keys until toward the end of the operation.

As the arms 141 and 142 are brought together they engage studs 177 carried by the elements 165 and adjust the units and tens elements to zero and the dollar element to the "one" position. These movements rotate the gears 166 around the segments 75, which are positively connected to the operating members 45 for the amount purchased banks, and cause the gears 167 rigid with the gears 166 to position the differential gears 168 accordingly, that is, the gear 168 for the dollars bank will be set at the "one" and the others at their zero positions.

The operating members 45 for the amount purchased banks are then adjusted, the units member to the "five" and the tens member to the second or twenty cent position. These movements are transmitted through the arms 65 (Fig. 3) and intermediate connections to the segments 75 (Fig. 8) causing the segments to drive the gears 166 and 167 and the main differential gears 168 backward from zero or counter clockwise (Figs. 7 and 8), the units gear five steps to the "five" position and the tens gear to the "eight" position. All movements of the main gears 168 are transmitted through the shafts 312, 332 and 322 to the cents ejector controlling shaft 240, the dimes controlling shaft 287 and the dollars shaft 251 respectively. As a result, at this point in the operation the shaft 251 and cam 253 will have been turned one-tenth of a rotation clockwise from the position shown in Fig. 15, thereby elevating the ejector 242 one step. The cents shaft 240 will have been turned five-tenths of a rotation counter clockwise (Figs. 16 and 17), in which position the cams on the shaft will hold the penny ejectors 229 and 230 down where they will not engage the coins when reciprocated. At the same time the gear 168 for the tens of cents bank should have turned the tens of cents shaft 287 counter clockwise (Figs. 13 and 18 to 21) two-tenths of a rotation to the "eight" position, but as the penny shaft 240 started its counter clockwise movement the portion 253 of the cam 348 swung the yoke 345 to the right (Fig. 14) thereby, on account of the manner in which the spiral gears 333 and 334 co-act, causing the shaft 287 to move a half step clockwise so that when the shaft 287 comes to rest it will be in what may be termed the "eight and one-half" or eighty-five cent position. When in this position operation of the ejectors would eject a dime from the tube 215, a quarter from the tube 218 and a half dollar from the tube 219. A dollar would also, of course, be ejected from the tube 220. However, the correct change is 75 cents, not $1.85, and it is clear that before the ejectors are operated the dollars shaft 251 must be returned to zero and the dimes shaft adjusted to the seven and one-half or 75 cent position.

As the gears 168 for the units and tens of cents start their movement backward from zero, the cam portions 186 of the grooves in the disks 181 attached to the units and tens of cents gears rock the arms 187 (Fig. 4) up to bring the shoulders 190 thereon into the path of the shoulders 191 on the disks 192. As a result, the rock frames 89 for the tens of cents and dollars banks will both be rocked, thereby causing the dollar key and the tens of cents zero stop 130 to move the arms 141 and 142 upward and rotate the elements 165 one step. As the elements 165 are rotated, the segments 75 which are now stationary cause the gears 166 and 176 to turn in such a way as to move the gears 168 backward a step. These movements are transmitted to the dimes shaft 287 and the dollars shaft 251, setting the latter shaft at zero and the former at the 75 cent position.

The eccentric shaft 236 is then rocked raising all of the bell cranks 281. The controlling elements 305 and 306 for the quarters ejector and the elements 307 and 308 for the half dollar ejector will be so positioned that the associated bell cranks will not be rocked on their pivots as they are raised and the ejectors 295 and 297 will remain connected for operation. The controlling elements for the two dimes ejectors and for the ejector for nickels will have been so positioned that the stops on their peripheries will be engaged by the rollers 283 on the bell cranks, the other rollers 284 entering the recesses in the peripheries. The three bell cranks last named are, therefore, rocked clockwise on their pivots as they are raised, thereby lifting the ends of the operating pitmen 228 to disengage the lugs 272 thereon from the notches 273 in the ejectors. Then when the shaft 225 is oscillated these three ejectors will not be disturbed, but the twenty-five cent ejector 295 and the half-dollar ejector 296 will be reciprocated to eject coins from their respective tubes.

In case the machine should be operated with an amount on the amount of purchase keys only or with an amount on the amount of purchase keys exceeding the amount set up on the amount tendered keys the higher order differential gears 168 will necessarily be rotated reversely from zero causing their cams 186 to position the levers 187 in the paths of the shoulders 190 so that the higher order rock frames 89 will be operated. This of course, will cause the dollar shaft 251 to be rotated backward from zero thereby causing the cam portion 3981 of the cam slot in the disk 391 attached to the dollar shaft to operate the bell crank 394, first to engage the stud 383 in the latching plate 379 and then slide said plate down to disengage the stud 386 thereon from the notch in the lower end of the operating lever 385. Then when said operating lever is operated by its cam groove 388 the three armed lever 378 will not be moved, but will be held stationary by the portion 398 of the slot in the bell crank 394. As a result the coin ejector actuating shaft 225 will be held stationary and no coins will be ejected. The arm 451 of the three-armed lever 378 will also hold the special indicator operating slide 458 up against the tension of the spring 401 in position for the stud 464 carried by the slide to be engaged by the shoulder 466 on the periphery of the disk 465. As a result said slide will be raised and rock the special indicator about the shaft 407 to bring the plates 452 and 453 in position to conceal the amount tendered indicators and call attention to the misoperation.

While the form of mechanism herein shown and described is admirably adapted to fulfil the objects primarily stated, it is to be understood that it is not intended to confine the invention to the one form of embodiment herein disclosed, for it is susceptible of embodiment in various forms all coming within the scope of the claims which follow.

What is claimed is:

1. In a machine of the class described, the combination with operating mechanism, of differential devices, a series of manipulative devices constructed to be selectively set in position to control the differential devices and movable by operation of the operating mechanism from one controlling position to another.

2. In a machine of the class described, the combination with operating mechanism, of differential devices, a series of keys selectively adjustable to positions controlling the differential devices and movable by operation of the operating mechanism from their first controlling positions to other controlling positions.

3. In a machine of the class described, the combination with operating mechanism, of differential devices, a series of oscillatory keys selectively depressible to positions controlling the differential devices, and means requiring operation of the operating mechanism for oscillating the keys from one controlling position to another.

4. In a machine of the class described, the combination with differential devices, of a plurality of manually adjustable devices, means for setting the differential devices under the control of the manually adjustable devices, and means for automatically shifting said devices which were previously adjusted to alter the setting of the differential devices.

5. In a machine of the class described, the combination with differential devices, of a plurality of keys, means for setting the differential devices at positions corresponding to keys operated, and means for shifting operated keys to alter the setting of the differential devices.

6. In a machine of the class described, the combination with differential devices, of depressible keys, means for setting the differential devices according to keys depressed, and means for shifting depressed keys to alter the setting of the differential devices.

7. In a machine of the class described, the combination with differential devices, of a plurality of keys movable in one direction to control the setting of the differential devices and in a different direction to change the setting of the differential devices, means for setting the differential devices according to the first position of the operated key, and means for moving the operated key in the second direction to change the setting of the differential devices.

8. In a machine of the class described, the combination with differential elements, of a plurality of manually adjustable devices, means for setting the differential elements under the control of the manually adjustable devices, and means controlled by devices of lower order for shifting devices of higher order whereby to alter the setting of the differential elements.

9. In a machine of the class described, the combination with differential elements, of a plurality of manually adjustable devices, means for setting the differential elements under the control of the manually adjustable devices, and means controlled by devices of lower order for shifting devices of higher order to impart a step of movement to the higher order differential elements.

10. In a machine of the class described, the combination with a pair of movable members, of a series of stops constructed to be selectively set in position to control said members, means for moving each of the members relative to the other extents determined by the stop in controlling position, and means for moving said controlling stop to a different controlling position.

11. In a machine of the class described, the combination with a plurality of pairs of movable members, of a plurality of stops for each pair of members constructed to be selectively set in position to control said members, means for moving each member of a pair relative to the other member extents determined by the stop in controlling position, and means for moving the controlling stops to different controlling positions.

12. In a machine of the class described, the combination with a series of keys, of a key supporting frame constructed to permit both endwise and oscillatory movements of the keys, a movable device with which the keys become engaged when moved endwise, and means for moving the device to oscillate the keys.

13. In a machine of the class described, the combination with a series of depressible keys, of a key frame holding the keys and constructed to permit oscillatory movement of the keys, a rock frame with which the keys engage when depressed, and means for rocking the frame to oscillate the keys.

14. In a machine of the class described, the combination with a pair of differentially movable members, of a series of stops controlling said members, one or another of the stops being effective at each operation, means for moving the members to engage them with the effective stop, and means for moving the effective stop and thereby the engaged members to a different position.

15. In a machine of the class described, the combination with a pair of differentially and relatively movable members, of a series of keys selectively operable to control said members, means for imparting differential relative movements to the members to engage them with the operated key, and means for moving the operated key and thereby the pair of members.

16. In a machine of the class described, the combination with a pair of differentially and relatively movable members, of a series of stops controlling the members, one or another of the stops being effective at each operation, means for imparting differential relative movement to the members to engage them with the effective stop, and means for moving said stop to impart a unitary movement to the members.

17. In a machine of the class described, the combination with a pair of differentially and relatively movable members, of a series of keys selectively operable to control said members, means for imparting differential relative movement to the members to engage them with the operated key, and means for moving the operated key to impart a unitary movement to the members.

18. In a machine of the class described, the combination with a plurality of differentially adjustable elements, of a plurality of key banks, means controlled by the key banks for differentially adjusting the elements, and means controlled by lower order key banks for operating keys in higher order banks to effect a step of movement of the associated differential elements.

19. In a machine of the class described, the combination with a plurality of series of manipulative devices, of a plurality of pairs of complementarily movable members, means for imparting complementary movement to the members to engage them with operated manipulative devices, and means controlled by one series of manipulative devices for adjusting operated devices of another series and the members engaged therewith to a different position.

20. In a machine of the class described, the combination with a pair of movable members, of a series of stops constructed to be selectively set in position to control said members, means for moving the members in opposite directions to extents determined by the stop in controlling position, said movements invariably combining to a constant value, and means for moving said controlling stop to a different controlling position.

21. In a machine of the class described, the combination with a plurality of series of depressible keys, of a pair of complementarily movable members controlled by each series, means for imparting complementary movements to the members to engage them with depressed keys, and means controlled by keys of lower order for moving operated keys of higher order and the complementarily movable members engaged therewith.

22. In a machine of the class described, the combination with depressible keys arranged in denominational groups, of a pair of complementarily movable members controlled by each group of keys, means for imparting complementary movements to the members to engage them with depressed keys, and means controlled by keys of lower denomination for moving depressed keys of higher denomination whereby to impart a unitary movement to the members engaged with the latter keys.

23. In a machine of the class described, the combination with a keyboard comprising depressible amount of sale and amount tendered keys, the latter when depressed being adjustable from one controlling position to another, of differentially adjustable elements, means controlled jointly by the amount of sale and the amount tendered keys for differentially adjusting the elements, and devices controlled by the amount of sale keys for adjusting amount tendered keys from one controlling position to another.

24. In a machine of the class described, the combination with a keyboard comprising amount of sale and amount tendered keys, the latter keys each having two effective positions, of differentially adjustable elements, means controlled jointly by the amount of sale and the amount tendered keys for differentially adjusting the elements, and devices whereby the amount of sale keys control the effective positions of the amount tendered keys.

25. In a machine of the class described, the combination with a keyboard comprising depressible amount of sale and amount tendered keys, the amount tendered keys when depressed being adjustable from one controlling position to another, of differential devices adjustable in one direction under the control of the amount tendered keys and in the opposite direction under the control of the amount of sale keys, and means controlled by the amount of sale keys for adjusting depressed amount tendered keys from one controlling position to another whereby to effect movement of the differential devices a step in the amount of sale direction.

26. In a machine of the class described, the combination with a main operating mechanism, of a plurality of coin ejectors, means normally connecting the coin ejectors and the main operating mechanism, amount purchased and amount tendered manipulative devices, and means for disabling the aforesaid connecting means at an operation with an amount on the purchase manipulative devices exceeding the amount on the amount tendered devices.

27. In a machine of the class described, the combination with a main driving mechanism, of a plurality of coin ejectors, amount tendered keys, amount purchased keys, devices controlled jointly by the amount tendered and amount purchased keys for operating desired ejectors at an operation of the driving mechanism, and means controlled by the amount purchased keys for disabling said devices.

28. In a machine of the class described, the combination with a main driving mechanism, of a set of coin ejectors, an operating device common to all of the ejectors, means normally connecting the operating device and the main driving mechanism, amount tendered keys and amount purchased keys normally controlling operation of the ejectors, and means controlled by the amount purchased keys for disabling the aforesaid connecting means.

29. In a machine of the class described, the combination with a main operating mechanism, of a plurality of coin ejectors, means normally connecting the coin ejectors and the main operating mechanism, amount purchased keys, amount tendered keys, and means for disabling the aforesaid connecting means at an operation with an amount on the purchase keys exceeding the amount on the amount tendered keys.

30. In a machine of the class described, the combination with a main driving mechanism, of a set of coin ejectors, an operating device common to all of the ejectors, means normally connecting the operating device and the main driving mechanism whereby to actuate the latter at each operation of the former, amount tendered keys, amount purchased keys, and means for disabling the aforesaid connecting means at an operation with an amount on the purchase keys exceeding the amount on the tendered keys.

31. In a machine of the class described, the combination with a main driving mechanism, of a set of coin ejectors, an operating rack for each ejector, a rock shaft carrying a driving gear for each of the racks, means normally connecting the rock shaft to the driving mechanism and constructed to rock the shaft at each operation of said mechanism, amount tendered keys, amount purchased keys, and means for disabling the connecting means at an operation with an amount on the purchase keys exceeding the amount on the tendered keys.

32. In a machine of the class described, the combination with a main driving mechanism, of a plurality of coin ejectors, amount tendered and amount of purchase manipulative devices, devices controlled jointly by the amount tendered and amount of purchase manipulative devices for operating desired ejectors at an operation of the driving mechanism, and means controlled by the purchase manipulative devices for disabling said operating devices.

33. In a machine of the class described, the combination with a main driving mechanism, of a set of coin ejectors, an operating device common to all of the ejectors, means normally connecting the operating device and the main driving mechanism, amount tendered and amount purchased manipulative devices controlling operation of the ejectors, and means controlled by the amount purchased manipulative devices for disabling the aforesaid connecting means.

34. In a machine of the class described, the combination with a main operating mechanism, of coin ejecting mechanism, means normally connecting the coin ejecting mechanism and the main operating mechanism, amount tendered and amount purchased manipulative devices controlling the ejecting mechanism, means for disabling the aforesaid connecting means at an operation with an amount on the purchase manipulative devices exceeding the amount on the amount tendered manipulative devices, and means for indicating the misoperation.

35. In a machine of the class described, the combination with a main operating device, of coin ejecting mechanism, means normally connecting the coin ejecting mechanism and the main operating device, amount tendered and amount purchased manipulative devices, means automatically disabling the aforesaid connecting means at an operation with an amount on the purchase devices exceeding the amount on the amount tendered devices, and an indicator controlled by the disabling means.

36. In a machine of the class described, the combination with a main operating device, of coin ejecting mechanism, means normally connecting the coin ejecting mechanism and the main operating device, amount tendered keys, amount purchased keys, means automatically disabling the aforesaid connecting means at an operation with an amount on the purchase keys exceeding the amount on the amount tendered keys, and a special indicator controlled by said disabling means.

37. In a machine of the class described, the combination with a main operating device, of a plurality of coin ejectors, a separate normally effective connection between each coin ejector and the main operating device, a connection common to all of the ejectors and normally connecting the ejectors and the main operating device, amount tendered keys and amount purchased keys, devices controlled jointly by the amount tendered and amount purchased keys for disabling the separate connections singly or in combinations, and devices controlled by the amount purchased keys for disabling the common connection.

38. In a machine of the class described, the combination with a plurality of coin ejectors, of a common operating device therefor, a normally effective connection between each of the ejectors and the operating device, an invariably moved device, means operated by the invariably moved device for disabling the aforesaid connections, and manipulative devices controlling said means.

39. In a machine of the class described, the combination with a plurality of coin ejectors, of an operating rack for each ejector, a normally effective connection between each rack and its ejector, an invariably moved device, means operated by the invariably moved device for disabling the aforesaid connections, differentially adjustable elements controlling said means and manipulative devices controlling said elements.

40. In a machine of the class described, the combination with a plurality of coin ejectors, of an operating rack normally engaged with each ejector, an invariably moved device, means actuated by the invariably moved device for disengaging the racks from their ejectors, differentially adjustable elements controlling said means, and manipulative devices controlling the adjustment of the elements.

41. In a machine of the class described, the combination with a common operating mechanism, of a plurality of coin ejectors normally connected to said mechanism, amount purchased keys, amount tendered keys, means controlled jointly by the amount purchased and amount tendered keys for disconnecting the ejectors from the operating mechanism singly or in combinations, and devices controlled by the amount purchased keys whereby all of the ejectors may be disconnected by means of any amount purchased key.

42. In a machine of the class described, the combination with a plurality of coin ejectors, of an operating rack normally engaged with each ejector, an invariably moved device, means actuated by the invariably moved device for disengaging the racks from their ejectors, differentially adjustable elements controlling said means, and amount tendered and amount purchased keys controlling the adjustment of the elements.

43. In a machine of the class described, the combination with an indicator, of an invariably moved member, an element operatively connected to the indicator and normally in position to be actuated by the invariably moved member to display the indictator, means normally moving the element out of said position at each operation to prevent displaying the indicator, and manipulatively controlled devices for rendering said means ineffective.

44. In a machine of the class described, the combination with an indicator, of an invariably moved member, an element operatively connected to the indicator and constructed to be actuated by the invariably moved member when the indicator is to be displayed, means normally supporting said elements in position to be actuated by said member, means normally withdrawing the support at each operation to prevent displaying the indicator, and manipulatively controlled devices for disabling said means.

45. In a machine of the class described, the combination with a common operating mechanism, of a plurality of change delivering mechanisms, a normally effective separate connection between each change delivering mechanism and the common operating mechanism, manipulative devices, and means controlled by the manipulative devices for operating the connections during operation of the common operating mechanism to disconnect the desired change delivering mechanisms from the common operating mechanism.

46. In a machine of the class described, the combination with a common operating mechanism, of a plurality of change delivering mechanisms, a normally effective separate connection between each change delivering mechanism and the common operating mechanism, a connection common to all of the change delivering mechanisms and normally connecting same to the common operating mechanism, manipulative devices, and means controlled by the manipulative devices for disabling one or more of the separate connections or disabling the common connection during an operation of the common operating mechanism.

47. In a machine of the class described, the combination with a common operating mechanism, of a plurality of change delivering mechanisms, a normally effective separate connection between each change delivering mechanism and the common operating mechanism, a connection common to all of the change delivering mechanisms and normally connecting the same to the common operating mechanism, amount purchased keys and amount tendered keys, means controlled jointly by the amount purchased keys and amount tendered keys for disabling desired ones of the separate connections, and means controlled by the amount purchased keys for disabling the common connection.

48. In a machine of the class described, the combination of change delivering devices, a main operating mechanism, means normally connecting the delivering devices and the operating mechanism, amount tendered keys and amount purchased keys, and means automatically operating the connecting means to disconnect the change delivering devices from the operating mechanism whenever the amount on the amount purchased keys exceeds the amount on the amount tendered keys.

49. In a machine of the class described, the combination with a common operating mechanism, of a plurality of change delivering devices normally connected to the common operating mechanism, a rotatable shaft, means for differentially rotating said shaft in either direction from a neutral position, and means whereby rotation of the shaft in one direction disconnects all of the change delivering devices from the common operating mechanism.

50. In a machine of the class described, the combination with a set of differential elements, of a plurality of series of stops controlling said elements, one or another of the stops in each series being effective at each operation, means for operating the differential devices according to the stops in effective position, and means controlled by lower order stops for shifting effective stops of higher order to positions of the next lower value thereby reversely operating the differtial devices.

51. In a machine of the class described, the combination with a series of keys, of a key supporting frame constructed to permit both endwise and lateral movement of the keys, a movable device with which the keys become engaged when moved endwise, means for moving the device to move the engaged keys laterally, and differential devices controlled by the keys engaged with said movable device.

In testimony whereof I affix my signature.

JOHN A. WERNER.

Copies of this patent may be obtained for five cents each, by addressing the "Commissioner of Patents, Washington, D. C."

DISCLAIMER.

1,279,053.—*John A. Werner*, Dayton, Ohio. CASH REGISTER AND MONEY CHANGER. Patent dated September 17, 1918. Disclaimer filed October 18, 1926, by the assignee by mesne assignments, *The National Cash Register Company*.

Hereby entered as follows:

"Claim 1. Your petitioner disclaims any construction falling within the terms of claim 1 except those in which the shifting of the manipulative devices from one controlling position to another occurs during the operation which immediately follows the selective setting of such devices.

"Claim 4. Your petitioner disclaims any construction falling within the terms of claim 4 except those in which the shifting of the manually adjustable devices occurs during the operation which immediately follows the initial setting of the manually adjustable devices."

[*Official Gazette November 2, 1926.*]